United States Patent
Okajima et al.

(10) Patent No.: US 9,539,544 B1
(45) Date of Patent: *Jan. 10, 2017

(54) EXHAUST GAS PURIFIER

(71) Applicant: N.E. CHEMCAT CORPORATION, Tokyo (JP)

(72) Inventors: Toshinori Okajima, Shizuoka (JP); Makoto Nagata, Shizuoka (JP)

(73) Assignee: N.E. CHEMCAT CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/252,862

(22) Filed: Aug. 31, 2016

Related U.S. Application Data

(62) Division of application No. 14/396,234, filed as application No. PCT/JP2013/060669 on Apr. 9, 2013, now Pat. No. 9,480,948.

(30) Foreign Application Priority Data

May 14, 2012 (JP) ................................. 2012-110519

(51) Int. Cl.
*B01D 50/00* (2006.01)
*B01D 53/94* (2006.01)
(Continued)

(52) U.S. Cl.
CPC ......... *B01D 53/9477* (2013.01); *B01D 53/944* (2013.01); *B01D 53/9418* (2013.01);
(Continued)

(58) Field of Classification Search
CPC ... F01N 3/035; F01N 13/0097; B01J 35/1061; B01J 35/1066; B01D 2255/2042; B01D 2257/406
(Continued)

(56) References Cited

U.S. PATENT DOCUMENTS

| 4,675,308 A | 6/1987 | Wan et al. |
| 4,902,487 A | 2/1990 | Cooper et al. |

(Continued)

FOREIGN PATENT DOCUMENTS

| JP | 1-318715 A | 12/1989 |
| JP | 5-38420 A | 2/1993 |

(Continued)

OTHER PUBLICATIONS

International Search Report dated Jul. 9, 2013 issued in corresponding application No. PCT/JP2013/060669.

(Continued)

*Primary Examiner* — Tom P Duong
(74) *Attorney, Agent, or Firm* — Westerman, Hattori, Daniels & Adrian, LLP

(57) ABSTRACT

An exhaust gas purification catalyst apparatus, which is superior in oxidation performance of, in particular, nitrogen monoxide, among hydrocarbons, carbon monoxide, nitrogen oxides and particulate components such as soot, included in exhaust gas from a lean burn engine, and combustion performance of light oil. The exhaust gas purification apparatus arranged with an oxidation catalyst (DOC) comprising a noble metal component for oxidizing carbon monoxide, hydrocarbons, in particular, nitrogen monoxide among nitrogen oxides, and for combusting light oil, a catalyzed soot filter (CSF) including a noble metal component for collecting a particulate component such as soot and removing by combustion (oxidation). The oxidation catalyst (DOC) has a catalyst layer where platinum (Pt), palladium (Pd) and barium oxide (BaO) are supported on alumina ($Al_2O_3$) having a pore size of 12 to 120 nm, and ratio of platinum and palladium is 1:1 to 11:2 in weight equivalent.

10 Claims, 4 Drawing Sheets

(51) Int. Cl.
  *B01J 23/44*    (2006.01)
  *B01J 21/04*    (2006.01)
  *B01J 35/00*    (2006.01)
  *B01J 35/10*    (2006.01)
  *F01N 3/035*    (2006.01)
  *F01N 3/20*     (2006.01)
  *F01N 3/10*     (2006.01)

(52) U.S. Cl.
  CPC ............... *B01J 21/04* (2013.01); *B01J 23/44* (2013.01); *B01J 35/0006* (2013.01); *B01J 35/1061* (2013.01); *B01J 35/1066* (2013.01); *F01N 3/035* (2013.01); *F01N 3/103* (2013.01); *F01N 3/206* (2013.01); *F01N 3/2066* (2013.01); *B01D 2255/1021* (2013.01); *B01D 2255/1023* (2013.01); *B01D 2255/2042* (2013.01); *B01D 2255/2092* (2013.01); *B01D 2255/902* (2013.01); *B01D 2255/9202* (2013.01); *F01N 2250/02* (2013.01); *F01N 2370/02* (2013.01); *F01N 2570/10* (2013.01); *F01N 2570/12* (2013.01); *F01N 2570/14* (2013.01); *F01N 2610/02* (2013.01)

(58) Field of Classification Search
  USPC ........................................................ 422/172
  See application file for complete search history.

(56) References Cited

U.S. PATENT DOCUMENTS

| | | |
|---|---|---|
| 6,497,851 B1 | 12/2002 | Hu et al. |
| 2006/0266022 A1 | 11/2006 | Woerner et al. |
| 2008/0124264 A1 | 5/2008 | Ikeda et al. |
| 2008/0254978 A1 | 10/2008 | Kikuchi et al. |
| 2009/0158719 A1 | 6/2009 | Hallstrom et al. |
| 2009/0269265 A1 | 10/2009 | Ando et al. |
| 2010/0180581 A1 | 7/2010 | Grubert et al. |
| 2010/0184587 A1 | 7/2010 | Hao et al. |
| 2011/0286903 A1 | 11/2011 | Andreasson et al. |
| 2013/0025262 A1 | 1/2013 | Yano et al. |

FOREIGN PATENT DOCUMENTS

| | | |
|---|---|---|
| JP | 3-103636 A | 4/1996 |
| JP | 2002-502927 A | 1/2002 |
| JP | 2005-262071 A | 9/2005 |
| JP | 2008-279428 A | 11/2008 |
| JP | 2009-262098 A | 11/2009 |
| JP | 2011-506827 A | 3/2011 |
| JP | 2011-220158 A | 11/2011 |
| WO | 2010/083315 A2 | 7/2010 |

OTHER PUBLICATIONS

Nova et al., "NH3-NO/NO2 chemistry over V-based catalysts and its role in the mechanism of the Fast SCR reaction", Catalysis Today, vol. 114, 2006, pp. 3-12.

Takahashi et al., "Influence of Support Materials and Aging on NO Oxidation Performance of Pt Catalysts under an Oxidative Atmosphere at Low Temperature", Journal of Chemical Engineering of Japan, vol. 40, No. 9, 2007, pp. 141-748.

Extended (Supplementary) European Search Report dated Dec. 10, 2015 issued in counterpart European Application No. 13791211.9 (6 pages).

EXHAUST GAS PURIFIER

CROSS-REFERENCE TO RELATED APPLICATIONS

This is a divisional of U.S. application Ser. No. 14/396,234 filed on Oct. 22, 2014, which is a 371 of PCT/JP2013/060669 filed on Apr. 9, 2013, which claims priority to Japanese Application No. 2012-110519 filed May 14, 2012, the entire contents of which is incorporated herein by reference.

TECHNICAL FIELD

The present invention relates to an exhaust gas purification apparatus, and in more detail, the present invention relates to an exhaust gas purification catalyst apparatus combined an diesel oxidation catalyst (DOC) and a catalyzed soot filter (CSF), which are superior in oxidation performance of, in particular, nitrogen monoxide (NO), among hydrocarbons (HC), carbon monoxide (CO), nitrogen oxides ($NO_x$) and particulate components such as soot, included in exhaust gas from a lean burn engine, and combustion performance of unburned fuel such as light oil.

BACKGROUND ART

In exhaust gas discharged from a lean burn engine such as a boiler, a gas turbine, a lean burn-type gasoline engine or a diesel engine, various harmful substances derived from fuel or combustion air are included. Such harmful substances include a hydrocarbon (HC), a soluble organic fraction (it may also be called SOF), soot, carbon monoxide (CO), nitrogen oxides ($NO_x$) and the like, and regulations on discharge amount of these harmful components have been strengthening year by year. As a purification method of these harmful components, there has been practically used a method for purifying exhaust gas by making it contacted with a catalyst.

In such a lean burn engine, there has also been investigated on suppression of generation amount of harmful substances by controlling kinds, supply amount and supply timing of fuel, amount of air or the like. However, satisfactory purification of exhaust gas has not been attained by a conventional catalyst or a control method. In particular, in a lean burn engine, nitrogen oxides are easily discharged, in addition, regulation thereof has been strengthening more and more, however, by conventional $NO_x$ purification technology, in the case of a diesel engine mounted on an automobile, it is difficult to suppress discharge of the harmful substances by conventional $NO_x$ purification technology, because operation condition thereof is always changing.

Further, in recent year, regulation of discharge amount of carbon dioxide ($CO_2$) has been strengthened, as the greenhouse effect gas. Because discharge amount of $CO_2$ is proportional to fuel amount used in engine operation, it has been desired that, in a combustion engine, used amount of fuel is small and fuel efficiency is good. A diesel engine is a combustion engine having good fuel efficiency and small discharge amount of $CO_2$, however, includes a large quantity of $NO_x$ in exhaust gas.

To suppress discharge of $NO_x$ from a diesel engine, it is considered to make air/fuel ratio small mechanically, and supply to an engine a large quantity of fuel, which is also a reducing agent, however, it incurs deterioration of fuel efficiency, and also increases discharge of $CO_2$. In addition, such a combustion control cannot utilize advantage of a diesel engine, that is, good fuel efficiency.

As a method for purify NO in exhaust gas discharged from a lean burn engine such as a diesel engine, there has been known technology for denitration by reduction, where exhaust gas including $NO_x$ (NO and $NO_2$) contacts with a selective reduction catalyst consists of titanium oxide, vanadium oxide, zeolite and the like as main components, under presence of ammonia ($NH_3$) component arising by decomposition of urea, and it is referred to as a selective reduction method or a Selective Catalytic Reduction (hereafter it may be referred to as SCR) method.

In the SCR, where this $NH_3$ component is used as a reducing agent, $NO_x$ is finally reduced to $N_2$ mainly by the following reaction formulas (1) to (3):

$$4NO+4NH_3+O_2 \rightarrow 4N_2+6H_2O \quad (1)$$

$$6NO_2+8NH_3 \rightarrow 7N_2+12H_2O \quad (2)$$

$$NO+NO_2+2NH_3 \rightarrow 2N_2+3H_2O \quad (3)$$

In practice, in $NO_x$ purification by the $NH_3$ component, the reaction is promoted under atmosphere including NO and $NO_2$ each nearly half as in the expression (3) (refer to NON PATENT LITERATURE 1). However, most of $NO_x$ components discharged from a lean burn engine is nitrogen monoxide (refer to PATENT LITERATURE 1), therefore, in order to purify $NO_2$ efficiently, so as to increase concentration of the $NO_2$ component in exhaust gas, there has been proposed an arrangement of an NO oxidation means at an exhaust gas passage (refer to PATENT LITERATURE 2). Specifically, platinum (Pt) having high oxidation capability of NO is used as an oxidation catalyst.

There has also been proposed a method for purifying harmful particulate components, $NO_x$, in one catalyst system simultaneously, by utilizing such an NO oxidation means. One of them is the one for purifying $NO_x$ by arranging the oxidation catalyst in exhaust gas passage, arranging a filter at the latter part thereof, spraying the ammonia component at the latter part thereof, and using the selective reduction catalyst (SCR) arranged at the latter part thereof (refer to PATENT LITERATURE 3).

By such a catalyst arrangement, it is possible to perform a means for oxidizing NO in exhaust gas to $NO_2$, by an oxidation catalyst, and removing by combustion of particulate components, and purifying by reduction of $NO_x$, simultaneously, using a single catalyst system. And, it has been known that a platinum component is effective as this oxidation catalyst component of NO (refer to PATENT LITERATURE 4 and NON PATENT LITERATURE 2).

In this way, there have been proposed a purification of $NO_x$ and a purification means of the particulate components, however, any cases thereof is the one aiming at increasing purification efficiency of $NO_x$ in SCR, by increasing concentration of $NO_2$ in exhaust gas, by arranging DOC in front of SCR.

In addition, purification technology of soot or SOF (they may hereafter be referred to collectively as a "particulate component" or PM: Particulate Matter) influences also on fuel efficiency enhancement of a diesel engine. As for the particulate component, there has practically been used a method for arranging a heat resistant filter (DPF: Diesel Particulate Filter) in exhaust gas passage, and filtering off the particulate component with this filter. The particulate component thus filtered off deposits on the filter, and continued deposition of the particulate component on the filter incurs decrease in output of an engine caused by pressure increase accompanied with clogging of the filter. Accordingly, there has been investigated regeneration of the filter by combustion removal of the particulate component deposited on the filter (PATENT LITERATURE 3, PATENT LITERATURE 4).

In the system of PATENT LITERATURE 3 and PATENT LITERATURE 4, by arranging DPF at the latter part of DOC, the particulate component deposited on the filter is removed by combustion utilizing $NO_2$ in addition to oxygen. Utilization of $NO_2$, because of enabling to initiate combustion of the particulate component from low temperature, not only promotes removal by combustion of the particulate component but also enables to lengthen interval to regeneration of the filter by suppression of increase in pressure drop. Among the filters for capturing and removing by combustion the particulate component in this way, DPF coated with a catalyst component is also referred to as CSF (Catalyzed Soot Filter).

In this way, in DOC, the noble metal component such as platinum (Pt) or palladium (Pd) is used aiming at removing by oxidation of HC or CO in exhaust gas, or in CSF, aiming at purifying by oxidation of soot or SOF in exhaust gas, respectively, however, DOC also has action of oxidation of NO in exhaust gas to $NO_2$, as described above. Exhaust gas having increased amount of $NO_2$ promotes reduction purification of $NO_x$ in SCR at the backward, and combustion of the particulate component at DPF or CSF.

In addition, increase in temperature of exhaust gas by utilization of HC in exhaust gas at DOC is effective to promote removal by combustion of the particulate component deposited onto DPF or CSF arranged at the backward of DOC. Therefore, in an exhaust gas purification system of a diesel engine, there may be the case where HC components are combusted (oxidized) by supplying the HC components to DOC. As a means for using the HC components to increase temperature of exhaust gas in this way, there is a method for supplying relatively more amount of fuel to an engine and generating unburned HC and supplying it to DOC; or a method for supplying fuel by spraying in the piping from an engine to DOC.

In this way, there have been proposed various methods of purification of $NO_x$ and a purification means of the particulate components, however, with strengthening of exhaust gas regulations in recent years, there has been tendency of not only increasing number of catalysts to be used in the exhaust gas purification system corresponding to exhaust gas from a lean burn engine, but also requiring to attain higher function of an individual catalyst. Therefore, there has been increasing tendency of amount of high price noble metals to be used in DOC or CSF.

Under such circumstances, there has been required a way to solve two conflicting problems for DOC or CDF containing a noble metal such as Pt or Pd, that is, enhancement of removing performance by oxidation of CO, HC, soot or the like, oxidation performance of NO, and combustibility of unburned fuel such as light oil, and simultaneously decreasing use amount of the noble metal.

Accordingly, the present inventor has proposed an exhaust gas purification method characterized by arranging an oxidation means, a spraying means of a urea aqueous solution and a specific selective reduction catalyst, in this order in a passage of an exhaust gas discharged from a diesel engine, including a platinum component or a palladium component, as a noble metal component, which is said oxidation means, and after increasing concentration of nitrogen dioxide with oxidation of hydrocarbon components, carbon monoxide, nitrogen monoxide, and nitrous oxide in exhaust gas, by an oxidation catalyst, where amount of this noble metal component is 0.1 to 3 g/L in metal equivalent, and amount of platinum in the noble metal component is 50 to 100% by weigh in metal equivalent, and then spray supplying the urea aqueous solution from the spraying means of the urea aqueous solution to the selective reduction catalyst, to decompose nitrogen oxides to nitrogen and water, with generated ammonia by contacting the SCR at 150 to 600° C. (refer to PATENT LITERATURE 5). By this method, it has become possible to purify $NO_x$ with using urea water, which is standardized and easily available, by a simple configuration without performing hydrolysis of urea outside the catalyst system.

However, this is not the one relating to improvement of the oxidation catalyst, and thus it cannot be said that use amount of the noble metal was decreased sufficiently.

CITATION LIST

Patent Literature

PATENT LITERATURE 1: JP-A-05-38420 (claim 1, paragraphs 0012, 0013, 0014)
PATENT LITERATURE 2: JP-A-08-103636 (claim 1, paragraphs 0002, 0012)
PATENT LITERATURE 3: JP-A-01-318715
PATENT LITERATURE 4: JP-A-2002-502927 (claim 1, paragraphs 0007, 0008)
PATENT LITERATURE 5: JP-A-2009-262098 (claim 12, paragraph 0015)

Non Patent Literature

NON PATENT LITERATURE 1: Catalysis Today 114 (2006) 3-12 (Page 2, left column)
NON PATENT LITERATURE 2: Influence of Support Materials and Aging on NO Oxidation Performance of Pt Catalysts under an Oxidative Atmosphere at Low Temperature, JOURNAL OF CHEMICAL ENGINEERING OF JAPAN, Vol. 40 (2007) No. 9 pp. 741-748

SUMMARY OF INVENTION

Technical Problem

In view of the above conventional technical problems, it is an object of the present invention to provide the exhaust gas purification catalyst apparatus, using in combination of the oxidation catalyst (DOC) and the catalyzed soot filter (CSF), which are superior in oxidation performance of, in particular, nitrogen monoxide (NO), among hydrocarbons (HC), carbon monoxide (CO), nitrogen oxides ($NO_x$) and particulate components such as soot, included in exhaust gas from a lean burn engine, and combustion performance of unburned fuel such as light oil.

Solution to Problem

The present inventors have intensively studied a way to solve the above conventional technical problems and found, as a result, that oxidation activity of, in particular, NO, and combustibility of unburned fuel such as light oil are promoted, in an exhaust gas purification apparatus arranged with the catalysts in the order of DOC, CSF and SCR, and arranged with the supply means of an ammonia component as a reducing agent, between DOC and SCR catalysts, when the DOC supports Pt and Pd of the noble metal component, onto one or more kinds of alumina having a pore size of 12 to 120 nm, and in this case, Pt and Pd are set at 1:1 to 11:2, in weight ratio, and has a catalyst layer added with barium oxide, and have thus completed the present invention.

That is, according to a first aspect of the present invention, there is provided an exhaust gas purification apparatus arranged with an oxidation catalyst (DOC) including a noble metal component for oxidizing, in particular, nitrogen monoxide, among carbon monoxide, hydrocarbons, nitrogen oxides, and for combusting light oil, a catalyzed soot filter (CSF) including a noble metal component for collecting a particulate component such as soot and removing it by combustion (oxidation), a reducing agent spraying means for supplying a reducing agent selected from a urea component or an ammonia component, and a selective reduction catalyst (SCR) for removing by reduction of nitrogen oxides by contacting with the reducing agent, in this order from the upstream side of an exhaust gas passage, in order to purify carbon monoxide, hydrocarbons, nitrogen oxides, and particulate components such as soot, in exhaust gas discharged from a diesel engine, characterized in that the oxidation catalyst (DOC) has a catalyst layer where platinum (Pt), palladium (Pd) and barium oxide (BaO) are supported on alumina ($Al_2O_3$) having a pore size of 12 to 120 nm, and ratio of platinum and palladium is 1:1 to 11:2 in weight equivalent In addition, according to a second aspect of the present invention, in the first aspect, there is provided the exhaust gas purification apparatus, characterized in that the catalyst layer is coated onto an integral structure-type substrate, in one or more layers.

In addition, according to a third aspect of the present invention, in the first aspect, there is provided the exhaust gas purification apparatus, characterized in that the catalyst layer has a base layer composed of alumina, at the lower layer thereof.

In addition, according to a fourth aspect of the present invention, in the first aspect, there is provided the exhaust gas purification apparatus, characterized that the alumina having the pore size of 12 to 120 nm is a mixture of two or more kinds of alumina having different pore size.

In addition, according to a fifth aspect of the present invention, in the first aspects, there is provided the exhaust gas purification apparatus, characterized in that the oxidation catalyst (DOC) is further installed also between the catalyzed soot filter (CSF) and the reducing agent spraying means.

In addition, according to a sixth aspect of the present invention, in the first aspect, there is provided the exhaust gas purification apparatus, characterized in that amount of barium oxide in the oxidation catalyst (DOC) is 0.5 to 4.0 g/L.

In addition, according to a seventh aspect of the present invention, in the first aspect, there is provided the exhaust gas purification apparatus, characterized in that coated amount of the catalyst layer in the oxidation catalyst (DOC) is 50 to 300 g/L.

In addition, according to an eighth aspect of the present invention, in the first aspect, there is provided the exhaust gas purification apparatus, characterized in that total supported amount of the noble metals in the oxidation catalyst (DOC) is 0.5 to 4.0 g/L in metal equivalent per volume.

In addition, according to a ninth aspect of the present invention, in the first or the fifth aspect, there is provided the exhaust gas purification apparatus, characterized in that the catalyzed soot filter (CSF) has a catalyst layer, where platinum (Pt) and palladium (Pd) are supported on alumina having a pore size of 12 to 120 nm, or a mixture of two or more kinds of alumina having different pore size within this range, and ratio of platinum and palladium is 1:1 to 11:4 in weight equivalent.

In addition, according to a tenth aspect of the present invention, in the ninth aspect, there is provided the exhaust gas purification apparatus, characterized in that coated amount of the catalyst layer in the catalyzed soot filter (CSF) is 4 to 100 g/L.

In addition, according to an eleventh aspect of the present invention, in the ninth or the tenth aspect, there is provided the exhaust gas purification apparatus, characterized in that total supported amount of the noble metals in the catalyzed soot filter (CSF) is 0.05 to 2.0 g/L in metal equivalent per volume.

Further, according to a twelfth aspect of the present invention, in the first aspect, there is provided the exhaust gas purification apparatus, characterized in that an ammonia oxidation catalyst (AMOX) is further arranged after the selective reduction catalyst (SCR).

Advantageous Effects of Invention

The exhaust gas purification apparatus of the present invention is superior in oxidation activity of NO, and combustibility of unburned fuel such as light oil, and is superior in oxidation performance of, in particular, NO, among HC, CO, $NO_x$ and particulate components such as soot, discharged from a lean burn engine such as a diesel engine, and combustion performance of unburned fuel such as light oil.

Further, the exhaust gas purification apparatus of the present invention can be manufactured in low cost, because of saving of use amount of the high price noble metals, and can manufacture and supply stably the exhaust gas purification apparatus.

REFERENCE SIGNS LIST 1 diesel engine
2 exhaust gas passage
3 reducing agent spraying means
4 oxidation catalyst (DOC)
5 catalyzed soot filter (CSF)
6 selective reduction catalyst (SCR)

DESCRIPTION OF EMBODIMENTS

Description will be given below in detail mainly on the case of applying the exhaust gas purification apparatus of the present invention to a diesel automobile application, however, it is not without saying that the present invention is also effective to a diesel engine to be used in various power sources such as power generation.

1. [Exhaust Gas Purification Apparatus (DOC+CSF+SCR)]

The present invention is the exhaust gas purification apparatus arranged with the specified oxidation catalyst (DOC) including the noble metal component for oxidizing nitrogen oxides (NO) in exhaust gas discharged from a diesel engine, the catalyzed soot filter (CSF) including the noble metal component for collecting and removing by combustion (oxidation) of particulate matter (PM) in exhaust gas, the reducing agent spraying means for supplying the reducing agent selected from a urea component or an ammonia component, and the selective reduction catalyst (SCR) not including the noble metal component for removing by reduction of nitrogen oxides ($NO_x$), by contacting with the reducing agent, in this order from the upstream side of an exhaust gas passage, and this exhaust gas purification catalyst apparatus (DOC+CSF+SCR) may also be referred to as a catalyst apparatus I.

Figure 1:
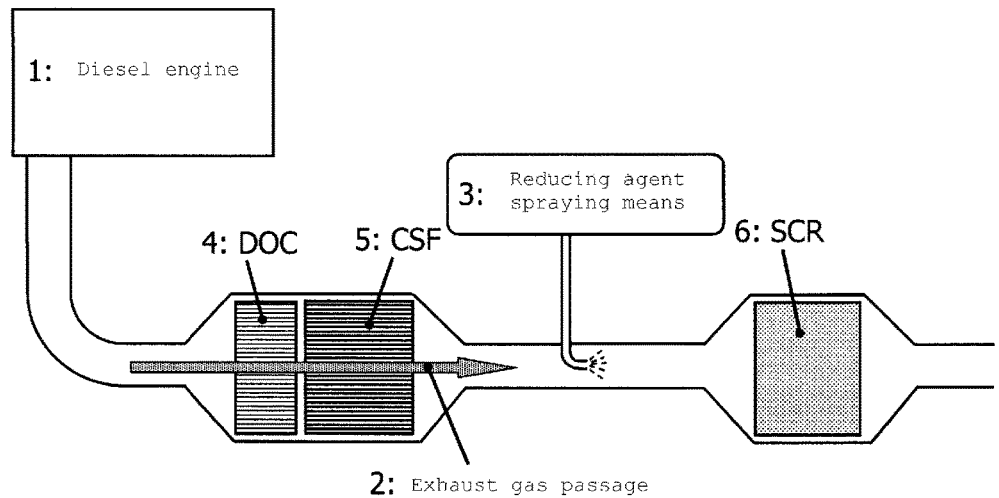
FIG. 1 is an explanation drawing showing schematically a configuration, where an oxidation catalyst (DOC), a catalyzed soot filter (CSF), a supplying means of a reducing component, and a selective reduction catalyst (SCR) are arranged in this order, in an exhaust gas purification catalyst apparatus of the present invention.

That is, as shown in FIG. 1, the catalyst apparatus I of the present invention is an exhaust gas purification catalyst apparatus installed with a spraying means of a reducing agent 3 at the backward of an oxidation catalyst (DOC) 4 and the catalyzed soot filter (CSF) 5 in passage of exhaust gas 2 from a diesel engine 1, and arranged with a selective reduction catalyst (SCR) 6 at the backward of this injection means 3.

In the catalyst apparatus I of the present invention, by oxidation of NO to $NO_2$ by DOC and CSF, an $NO_x$ reduction reaction, using a urea aqueous solution or an ammonia aqueous solution (hereafter, it may be referred to as an ammonia component or a $NH_3$ component) in SCR arranged backward thereof, is promoted.

In addition, by combusting unburned light oil at DOC to raise exhaust gas temperature, by periodically spraying unburned light oil to the inside of a cylinder of a diesel engine, or to the inside of a piping of the middle part of the diesel engine and DOC, soot accumulated in CSF is combusted using combustion heat thereof.

1. [DOC: Oxidation Catalyst]

DOC to be used in the present invention is an oxidation catalyst including the noble metal component for oxidizing NO, HC or CO in exhaust gas and unburned fuel such as light oil, and contains at least a platinum component and a palladium component as the noble metal component.

(Noble Metal Component)

In the oxidation catalyst, as described above, the platinum component is generally used as the noble metal component, and the palladium component may also be used in some cases. However, it is difficult to obtain sufficient NO oxidation activity only by the Pd component. In addition, the Pd component may be poisoned easily by a sulfur component in light oil or heavy oil, which is fuel of a diesel engine, thus may be deactivated during use for a long period of time.

Although Pd has such a problem, because it is far inexpensive in price as compared with Pt, or it may exhibit higher oxidation activity than Pt, depending on HC species or atmosphere of exhaust gas, by suitable distribution of supporting ratio of Pt and Pd, optimum condition in view of performance and price can be found out.

In the present invention, in consideration of the above, ratio of Pt and Pd is preferably 1:1 to 11:2, and more preferably 3:2 to 11:2. The ratio below 1:1 largely decreases oxidation activity of HC, CO, NO or the like, accompanied with decrease in content of platinum, and largely decreases heat generation capability of exhaust gas by combustion of unburned fuel light oil or the like, while the ratio over 11:2 could lose merit in view of price.

In addition, in the present invention, supported amount of the noble metal component of DOC is preferably 0.5 to 4.0 g/L, and more preferably 0.8 to 3.0 g/L in metal equivalent per volume of an integral structure-type substrate. Too low amount of the noble metal component does not sufficiently provide removal performance by oxidation of HC or CO, oxidation performance of NO, and combustibility of unburned fuel such as light oil, while too high amount of the noble metal component could lose merit in view of price.

Further, in the present invention, coated amount of the catalyst layer of the oxidation catalyst (DOC) is preferably 50 to 300 g/L, and more preferably 70 to 250 g/L. The coated amount of the catalyst layer below 50 g/L decreases oxidation activity by deterioration of dispersion property of the noble metals such as platinum to be supported, while the amount over 300 g/L increases pressure drop by narrowing inside the cell, and thus not preferable.

(Promoter Component)

In the oxidation catalyst (DOC) in the exhaust gas purification apparatus of the present invention, barium (Ba) is used as a promoter. Ba is one of the elements having high ionization tendency, and gives an electron to the noble metals such as Pt or Pd to promote reduction of the noble metals. In particular, Ba has good compatibility with Pd and has function to promote activity of Pd.

As a starting salt of Ba, a water-soluble salt is preferable, due to providing high dispersion on alumina, and barium acetate, barium chloride, barium nitrate, barium hydroxide, and barium oxide (it is converted to barium hydroxide when dissolved in water) are used.

Among them, barium acetate or barium hydroxide (barium oxide) is preferable, because of having high solubility to water, and being easily oxidized at relatively low temperature, when converted to an oxide by heat treatment under air atmosphere inside an electric furnace.

In the present invention, supported amount of Ba is preferably 0.5 to 4.0 g/L, and more preferably 0.5 to 3.0 g/L in barium oxide equivalent. The supported amount in barium oxide equivalent less than 0.5 g/L could become inferior in electron donating property to Pt or Pd. On the other hand, the supported amount in barium oxide equivalent over 4.0 g/L could increase the capability to discharge as NO, due to storage of $NO_2$ oxidized by Pt.

(Inorganic Base Material)

The above noble metal component or the promoter is supported onto an inorganic oxide (an inorganic base material), and mixed with other catalyst components, as needed, and coated onto the structure-type substrate as a catalyst composition. As the inorganic oxide as the base material for supporting the noble metal component in this way, a known catalyst material for exhaust gas purification can be used. Such an inorganic material is preferably a porous inorganic oxide, due to having high heat resistance, large specific surface area, thus being capable of providing stable and high dispersion of the noble metal component.

As one example of the inorganic oxide (inorganic base material) for supporting the noble metals or the promoter, alumina is included. As a material of alumina, there are included γ-alumina, β-alumina, δ-alumina, η-alumina, and θ-alumina, and among them, γ-alumina is preferable. In addition, it is preferable that lanthanum oxide, zirconia, ceria or the like is added to γ-alumina. In particular, γ-alumina added with lanthanum oxide is superior in heat resistance, and in the case that the noble metal component such as the platinum component or the palladium component is supported, it is possible to maintain the high catalytic activity, even at high temperature (JP-A-2004-290827).

In the present invention, it is preferable that alumina has a pore size (mode diameter, the same shall apply hereafter) of 12 to 120 nm, more preferably 12 to 80 nm, and still more preferably 12 to 60 nm. The pore size of alumina smaller than 12 nm not only delays diffusion of gas inside the pore, but also could clog the pores by soot or the like. On the other hand, the pore size larger than 120 nm decreases relatively BET specific surface area and deteriorates dispersion of the noble metals or the promoter, and thus it is not preferable.

In addition, BET specific surface area value (based on a BET method, the same shall apply hereafter) of alumina is preferably 80 to 250 $m^2/g$, and still more preferably 100 to 200 $m^2/g$. The BET specific surface area of alumina larger than 250 $m^2/g$ decreases relatively the pore size, and thus could deteriorate gas diffusion or clog the pores. On the other hand, BET specific surface area smaller than 80 $m^2/g$ could deteriorate dispersion of the noble metals or the promoter.

In the present invention, alumina having a pore size of 12 to 120 nm may be one kind, however, it is preferable to be a mixture of two or more kinds having different pore size. Reason for this is that it is considered that for gas species having the smaller molecular weight, a base material having the smaller pore size becomes preferable in view of contact probability between gas and active species, while on the contrary for gas species having the larger molecular weight, a base material having the larger pore size becomes preferable in view of gas diffusion inside the pore. For example, for long chain HC having large molecular weight, alumina having relatively large pore size is preferable, because of difficulty in entering inside the pore, unless the pore size is as large as 20 to 120 nm, while for CO or NO having small molecule weight, alumina having relatively small pore size is not necessarily preferable, because of easy entering inside the pore and thus making a reaction easy, even when the pore size is as small as 12 to 20 nm.

(Backing Material)

In the present invention, as a substrate of DOC, a flow-through-type honeycomb structure of an integral structure is used, where through holes having both ends opened accumulate to provide a honeycomb shape, as will be described later. Usually, as this honeycomb structure, the one having specifications of quadrangular prism cell is used, therefore by coating catalyst slurry, the catalyst becomes easily accumulated at the four corners by surface tension. Therefore, the catalyst layer becomes thick only at the four corners of the quadrangular prism cell, and on the contrary, the catalyst layer at the other parts becomes relatively thin. The thick catalyst layer requires longer time when gas diffuses from the surface to the bottom of the catalyst layer, resulting in no effective use of the noble metals at the bottom part, in a portion having thick catalyst layer. To avoid this, it is preferable that the four corners are filled up by coating the backing material to become the bottom layer, in advance.

As such a material, alumina, silica, zeolite or the like can be used. These materials are not especially limited in view of property thereof, however, such one is preferable as having a certain level of BET specific surface area, and being inexpensive.

It should be noted that the coated amount of the backing material is preferably 20 to 130 g/L, and more preferably 30 to 100 g/L. The coated amount of the backing material below 20 g/L could provide inferior effect of filling up the four corners of the quadrangular prism cell. On the other hand, the amount over 130 g/L increases pressure drop due to narrowing inside the cell, and thus it is not preferable.

(Starting Salt of Noble Metal and Combustible Substance)

In order to support platinum of a noble metal onto the above inorganic base material by making composite with palladium, as a starting salt of platinum, an ethanolamine solution of hexahydroxoplatinic(IV) acid, tetraammineplatinum(II) acetate, tetraammineplatinum(II) carbonate, tetraammineplatinum(II) nitrate, a nitric acid solution of hexahydroxoplatinic(IV) acid, platinum nitrate, diamminedinitroplatinum nitrate, hexachloroplatinic(IV) acid or the like can be used. In addition, as a starting salt of palladium, tetraamminepalladium(II) acetate, tetraamminepalladium(II) carbonate, tetraamminepalladium(II) nitrate, diamminedinitropalladium, palladium nitrate, palladium chloride or the like can be used. The preferable one as the starting salt of platinum is the ethanolamine solution of hexahydroxoplatinic(IV) acid, platinum nitrate, diammine dinitroplatinum nitrate, tetraammineplatinum (II) nitrate, or the like, and the one where components other the noble metal easily volatilizes by heat treatment in catalyst preparation is preferable.

It should be noted that the case of using a chloride as the starting salt could give adverse influence on catalytic activity due to remaining of chlorine, depending on a production method.

After mixing an aqueous solution of such a metal salt and the inorganic base material, drying and calcining thereof can be performed by a known method, as appropriate.

Platinum and palladium may be supported each separately in supporting, however, in the present invention, in order to make platinum and palladium close as much as possible, in expectation of synergy effect, it is preferable to match property (acidity, alkalinity) of aqueous solution of each starting salt of platinum and palladium. For example, there is included a combination of tetraammineplatinum(II) acetate-tetraamminepalladium(II) acetate (both are alkaline); an ethanolamine solution of hexahydroxoplatinic(IV) acid-tetraamminepalladium(II) acetate (the same as above); platinum nitrate-palladium nitrate(both are acidic); diamminedinitroplatinum nitrate-palladium nitrate (the same as above); hexachloroplatinic(IV) acid-palladium chloride(the same as above) or the like.

By making property of the aqueous solutions of each of the starting salts of platinum and palladium the same, a uniform solution state can be maintained as it is, without generation of a precipitate even in mixing both aqueous solutions, therefore the platinum particle and the palladium particle are present each in a mixed state, and it becomes easy for each to come close, even after making supported onto the inorganic base material.

In addition, in the present invention, it is preferable to add a combustible substance, in producing slurry by adding a catalyst component, in advance. It is because, in calcining after coating the slurry onto a substrate having an integral structure, the combustible substance is calcined to generate heat, and generates high temperature, and thereby the catalyst components are sintered onto the substrate, as well as the noble metal components such as platinum are fixed onto the inorganic base material, and therefore temperature requiring for calcining can be decreased Further, in using a combustible substance, because the combustible substance combusts (oxidizes) at the vicinity of catalyst surface and consumes oxygen in air, catalyst surface is possible to become a reduced state, therefore the noble metals such as platinum becomes a reducing atmosphere at high temperature, which gives expectation of particle growth, while the noble metals such as platinum maintain a metal state.

As the combustible substance, an inexpensive material containing carbon is preferable, and includes, for example, in addition to refined sugar, monosaccharides such as fructose, glucose, brain sugar; disaccharides such as sucrose, maltose, lactose.

These combustible substances have characteristics of being safe as materials, and superior also in solubility, and not only sufficiently combust under condition in calcining, by coating the catalyst component onto the honeycomb structure, such as at an ignition temperature of 350° C., but also provide complete combustion easily and remain little residue such as soot, because of having less carbon atoms of 6 to 12 for forming a molecule.

This DOC may be used only one inside the apparatus, however, it may be made an apparatus of (DOC+DOC+CSF+SCR) by using two sets.

2. [Substrate Having Integral-Type Structure]

In the present invention, as DOC, in order to support the noble metal component in a good dispersion state, the substrate having an integral-type structure, that is, the honeycomb structure (hereafter it may also be referred to as a honeycomb substrate) is used. The honeycomb structure is a structure with a honeycomb shape where many through-holes are concentrated. As a material of such a honeycomb structure, stainless steel, silica, alumina, silicon carbide, cordierite or the like may be used, however, in the present invention, the honeycomb structure made of any of these materials may also be used.

As such a honeycomb structure, it is desirable to use a flow-through-type honeycomb structure having through holes, opened at both ends, integrated in a honeycomb shape, in applications not only for DOC but also SCR to be described later. On the other hand, in DPF and CSF to be described later, it is desirable to use a wall-flow-type honeycomb structure having through holes integrated in a honeycomb shape, which is open at one of the opening part of the through hole and is closed at the other end. In such a honeycomb structure-type catalyst, a catalyst composition dedicated for each honeycomb structure-type catalyst may be coated on one honeycomb structure.

Such a honeycomb substrate is selectable from known honeycomb structure-type substrates, and whole shape thereof is arbitrary and may be selected as appropriate from column-type, square pole-type, hexagonal cylinder-type or the like, in response to a structure of an exhaust system to be applied. Further, as for pore number of the opening part, a suitable pore number may be determined in consideration of kind of exhaust gas to be treated, gas flow rate, pressure drop or removal efficiency or the like, however, usually about 100 to 1500 pieces per one square inch (6.45 cm$^2$) is preferable, and 100 to 900 pieces is more preferable for application of exhaust gas purification of a diesel automobile. The cell density per one inch$^2$ (6.45 cm$^2$) of 100 pieces or more is capable of securing contact area between exhaust gas and the catalyst, and provides sufficient exhaust gas purification function, while the cell density per one inch$^2$ (6.45 cm$^2$) of 1500 pieces or less does not lead to significant pressure drop of exhaust gas, and does not impair performance of an internal combustion engine.

In addition, thickness of the cell wall of the honeycomb substrate is preferably 2 to 12 mil (milli inch) (0.05 to 0.3 mm), and more preferably 3 to 8 mil (0.076 to 0.2 mm).

(Catalyst Preparation Method)

In order to prepare a catalyst such as DOC from the honeycomb substrate to be used in the present invention, a washcoat method is generally used.

Firstly the catalyst material and the honeycomb substrate are provided. The catalyst material is prepared, together with additives such as a binder or a surfactant, as needed, by mixing with water or a solvent, where a water-soluble organic solvent is added to water, to make a slurry-like mixture, and by coating it onto the honeycomb substrate, and then by drying and calcining. That is, the catalyst material is mixed with water or a solvent, where a water-soluble organic solvent is added to water, (hereafter it may also be referred to as an aqueous medium), in specified ratio, to obtain the slurry-like mixture. In the present invention, the aqueous medium may be enough to be used in amount which is capable of dispersing each catalyst component uniformly in the slurry.

The catalyst material includes the noble metal component including at least platinum, as the inorganic base material. The noble metal component may be supported, in advance, onto the inorganic base material. The metal catalyst component and the inorganic base material are mixed in the aqueous medium, in advance, to prepare the slurry.

In preparing the catalyst material, in the case where the noble metal is supported on the inorganic base material, in advance, a known method may be adopted, as appropriate.

One example thereof is shown below, firstly, as a raw material of the noble metal component, a compound such as a nitrate, a carbonate, an acetate, a chloride, specifically, an ethanolamine solution of hexahydroxoplatinic(IV) acid, tetraammineplatinum(II) acetate, tetraammineplatinum(II) carbonate, tetraammineplatinum(II) nitrate, a nitric acid solution of hexahydroxoplatinic(IV) acid, platinum nitrate, diamminedinitroplatinum nitrate, hexachloroplatinic(IV) acid or the like, and as a starting salt of palladium, tetraamminepalladium(II) acetate, tetraamminepalladium(II) carbonate, tetraamminepalladium(II) nitrate, diamminedinitropalladium, palladium nitrate, palladium chloride or the like is prepared. By selecting any one from them and dissolving it in an organic solvent, a solution of the noble metal component is provided.

Then, the solution of this noble metal component is mixed with the inorganic base material, together with the aqueous medium, then it is dried at 50 to 200° C. to remove the solvent, and then it is calcined at 300 to 1,200° C. It should be noted that other than the above components, known catalyst materials may be blended, as a binder and the like. As such a known catalyst materials, there are included alumina, silica, titania, zirconia, silica-alumina, ceria, an alkali metal material, an alkaline earth metal material, a transition metal material, a rare earth metal material, silver, a silver salt and the like, and a dispersing agent, and a pH adjuster can be used in combination, as needed.

In order to cover the catalyst composition onto the honeycomb substrate, the catalyst composition is coated as the slurry-like mixture. The catalyst composition may be coated as one layer, or so as to become two or more layers. After coating the catalyst composition, drying and calcining are performed. It should be noted that drying temperature is preferably 100 to 300° C., and more preferably 100 to 200° C. In addition, calcining temperature is preferably 300 to 600° C., and particularly preferably 400 to 600° C. Drying time is preferably 0.5 to 2 hours and calcining time is preferably 1 to 3 hours. Heating may be performed using a known heating means such as an electric furnace, or a gas furnace.

(Function of DOC)

Major component of NO included in exhaust gas from an engine is NO. In a conventional exhaust gas purification catalyst apparatus, it has been said desirable that NO and $NO_2$ are set in suitable ratio to promote NO purification in the SCR catalyst. This NO: $NO_2$ ratio is set at about 1:1, in the SCR catalyst having zeolite such as Fe-β or MFI, as a major component.

Also in the exhaust gas purification apparatus of the present invention, DOC is arranged at the forward of the SCR catalyst to oxidize NO to $NO_2$, and increase $NO_2$ concentration in $NO_x$. As for such NO oxidation performance, the noble metal component has higher performance as compared with a transition metal, and the Pt component is superior to the Pd component (JP-A-2009-167844: paragraph [0021], JP-A-2008-526509: paragraph [0005], JP-A-2008-155204: paragraph [0006], NON PATENT LITERATURE 4 (JOURNAL OF CHEMICAL ENGINEERING OF JAPAN, Vol. 40 (2007) No. 9 pp. 741-748, or the like)).

In addition, at the latter part of DOC, a means for removing by combustion of the particulates such as soot trapped at the wall-flow-type honeycomb structure is arranged. In addition, in order to combust unburned fuel light oil by periodically spraying unburned fuel light oil to the inside of a cylinder of a diesel engine or to the inside of a piping of the middle part of the diesel engine and DOC, exhaust gas temperature is raised, and particulates such as soot are combusted using combustion heat thereof. As a means for removing by combustion of the particulates, a wall-flow-type honeycomb structure alone (DPF) or a catalyzed wall-flow-type honeycomb structure (CSF) is used. Use of the catalyzed wall-flow-type honeycomb structure (CSF) is general, because saving of fuel required for combustion, and decrease in initiation temperature for combusting the particulates such as soot are possible.

3. [CSF: Catalyzed Soot Filter]

In the present invention, the catalyzed soot filter (CSF) is a catalyzed soot filter including the noble metal component for capturing, and removing by combustion (oxidation) of the particulate matter (PM) in exhaust gas discharged from a diesel engine. It is preferable that the catalyzed soot filter (CSF) has a catalyst layer where platinum (Pt) and palladium (Pd) are supported onto one kind of alumina having a pore size of 12 to 60 nm, or a mixture of two or more kinds of alumina having different pore size within this range, and ratio of platinum and palladium is 1:1 to 11.4 in weight equivalent.

In the catalyst apparatus I of the present invention, it may be good that CSF is a bag filter having high heat resistance, however, it is desirable to catalyze and use the wall-flow-type honeycomb structure obtained by making a sintered compact of an inorganic oxide such as silica, alumina, silicon carbide, cordierite porous.

CSF contains at least the platinum component and the palladium component as the noble metal component. Containment of the Pt component is capable of enhancing $NO_x$ reduction purification performance in the SCR catalyst at the latter part of CSF, by exerting NO oxidation performance also at even CSF, and by increasing $NO_2$ concentration in exhaust gas.

In addition, addition of the Pd component to the Pt component is expected to suppress volatilization of the Pt component. The catalyzed soot filter (CSF) has a ratio of platinum and palladium of preferably 1:1 to 11:4, and more preferably 3:2 to 11:4, in weight equivalent. Outside of this range is not preferable similarly as in the case of the above-described DOC. It is because, the ratio below 1:1 largely decreases oxidation activity of HC, CO, NO or the like accompanied with decrease in content rate of platinum, while the ratio over 11:4 increases decrease in denitration performance of SCR caused by the noble metal such as platinum volatilized, even under coexistence with palladium. And, the catalyzed soot filter (CSF) has a supported amount of platinum of preferably 0.05 to 2.0 g/L, and more preferably 0.1 to 1.5 g/L, in metal equivalent.

Further, in the present invention, a coated amount of an oxidizing component, which composes a catalyst layer of the catalyzed soot filter (CSF), is preferably 4 to 100 g/L, and more preferably 5 to 50 g/L. The coated amount of the oxidizing component below 4 g/L deteriorates dispersibility of the noble metal such as platinum to be supported, thus causing decrease in oxidation activity, while the amount over 100 g/L narrows pores opened countlessly at the filter cell wall, causing increase in pressure drop, and thus is not preferable.

Such CSF, in the present invention, may be said "a structure covered with the oxidation catalyst composition" similarly as DOC. Therefore, as for the inorganic base material, all of the porous inorganic oxides described in detail in the item of DOC can be used. In addition, as for the starting salt of the noble metals such as platinum, all of the raw materials described in detail in the item of DOC can be used.

Similarly as the above-described DOC, the honeycomb structure is used also for CSF. In particular, it is desirable to use a wall-flow-type substrate having through holes, integrated in a honeycomb shape, which are open at one of the opening part of the through hole and are closed at the other end. In the wall-flow-type substrate, wall of the through hole is composed of a porous material, and the particulate matter enters into the through hole together with exhaust gas from the through hole opening part, and exhaust gas passes through the porous hole of the through hole wall and is discharged backward, and the particulate component deposits in the through hole closed. By combustion removal of the particulate component deposited in this way, as described above, CSF is regenerated and becomes possible again to capture the particulate component from exhaust gas.

However, different from the flow-through-type honeycomb structure to be used in DOC, because the wall-flow-type honeycomb structure having function as a filter is used, the catalyst component to be used as CSF is required to have also different function from DOC, while having the same function as DOC.

In fact, coating of the same amount of the catalyst component on the wall-flow-type honeycomb structure, as on the flow-through-type honeycomb structure, increases pressure drop abnormally, thus significantly decreasing output of an engine, although the through hole wall is made of a porous material. Therefore, in the case of coating the catalyst component on the wall-flow-type honeycomb structure, amount of the catalyst component is preferably set to half or less, as compared with on the flow-through-type honeycomb structure.

(Function of CSF)

Major role of CSF is to remove by oxidation of particulate components such as soot trapped at the wall-flow-type honeycomb structure, and function of the catalyst component where the noble metals are supported, is to decrease initiation temperature for removing by oxidation of the particulate components such as soot. Furthermore, because CSF has oxidation catalyst function, and thus it enables to combust floating particulate matter such as soot and SOF attached in CSF from relatively low temperature, therefore it enables to decrease consumption of fuel for combustion such as soot. In addition, in the case of high level discharge amount of NO, NO is not oxidized sufficiently to $NO_2$ by only DOC, however, CSF is also capable of further oxidizing NO, which is not oxidized sufficiently by DOC, to $NO_2$.

4. [SCR Catalyst: Selective Reduction Catalyst]

In the catalyst apparatus I of the present invention, SCR catalyst (selective reduction catalyst) is arranged at the latter part of DOC and CSF. By this structure, highpurification performances are exerted not only for HC, CO and $NO_x$, but also soot and SOF.

The SCR catalyst to be used in the exhaust gas purification apparatus of the present invention is the one for purifying by reduction NO in exhaust gas using the ammonia component as the reducing agent. The SCR catalyst material includes, other than zeolite or a zeolite-like compound (crystal metal aluminophosphate) to be described later, various inorganic materials of a transition metal oxide such as vanadium oxide, titania, zirconia, or tungsten oxide; a rare earth oxide such as ceria, lanthanum oxide, praseodymium oxide, samarium oxide, gadolinium oxide, or neodymium oxide; a base metal oxide such as gallium oxide or tin oxide; or a composite oxide thereof, and the like. In addition, alumina or silica, and a mixture or a composite of alumina or silica modified with a rare earth, an alkali metal, an alkaline earth group and the like, with the above oxide, and the like are also included. However, it is desirable in an automotive application not to include a harmful heavy metal such as vanadium.

In the present invention, it is preferable that the SCR catalyst includes zeolite or crystal metal aluminophosphate. In addition, in the present invention, it is preferable that the noble metal component such as Pt or Pd is not included, because of generating NO by oxidation of the ammonia component.

Zeolite is a generic name of an aluminosilicate having micropores in a crystal, and is capable of selectively taking in a molecule inside the pore thereof, and promoting a reaction. Such a zeolite or the above inorganic material has superior NO reduction purification performance as an SCR material, however, it significantly decreases NO reduction purification performance when contaminated with a noble metal. On the other hand, according to the present invention, because Pt, which is the noble metal component in DOC, is supported on a honeycomb structure in a state difficult to be scattered even when exposed at high temperature, contamination of zeolite or the above inorganic material can be prevented, and superior NO reduction purification performance as the SCR catalyst can be exerted stably for a long period of time.

The SCR catalyst is preferably an integral structure-type substrate, such as a flow-through-type honeycomb structure or a wall-flow-type honeycomb structure.

(Zeolite and Zeolite-Like Compound)

In the present invention, zeolite is not especially limited, however, it may be selected as appropriate from a Y-type, β-type, MFI-type, CHA-type, USY-type, SUZ-type, MCM-type, PSH-type, SSZ-type, ERB-type, ITQ-type, mordenite, and ferrierite. In addition, it is included a crystal metal aluminophosphate, having a similar layer-like structure as zeolite (JP-A-60-86011). As such a crystal metal aluminophosphate, there has been known a crystalline aluminophosphate (ALPO) or a crystalline silicoaluminophosphate (SAPO), and they have been investigated as the SCR catalyst materials (US 2008/0241060). Such zeolite and the zeolite-like compound may be used alone or two or more kinds of the materials by mixing, or multiple materials may be coated in multilayer on the surface of the structure-type substrate. In addition, zeolite and the zeolite-like compound may be the ion exchanged one at the cation site thereof with a transition metal component such as iron, copper, or a rare earth such as cerium or lanthanum.

Among such zeolite and the zeolite-like compound, use of β-type zeolite is preferable in the present invention, as the SCR catalyst material. β-Type zeolite has a relatively complex 3D pore structure consisting of linear pore having relatively large diameter and aligned in one direction, and a curved pore crossing with them, and provides easy diffusion of a cation in ion exchange and easy diffusion of a gas molecule such as $NH_3$, as well as has property superior in reactivity and durability.

In addition, zeolite has an acid site which is capable of adsorbing a basic compound such as $NH_3$, and number of the acid site differs depending on Si/Al ratio thereof. Generally, zeolite having low Si/Al ratio has more number of the acid site, and has larger degree of degradation in durability under co-presence of steam, while on the contrary, zeolite having high Si/Al ratio is superior in heat resistance but has less acid site. In the $NH_3$ selective reduction catalyst, because $NH_3$ adsorbs at the acid site of zeolite, which becomes an active site to reduce and remove nitrogen oxides such as $NO_2$, the one having more acid sites (the one having lower Si/Al ratio) is advantageous for the denitration reaction. In this way, as for the Si/Al ratio, durability and activity are in a trade off relation, and in consideration of this, the Si/Al ratio of zeolite is preferably 5 to 500, more preferably 10 to 100, and still more preferably 15 to 50. Both the β-type zeolite and the MFI-type zeolite suitable for the SCR catalyst similarly have such characteristics.

(β-Type Zeolite)

It is preferable that, as the SCR catalyst material in the present invention, β-type zeolite, which is ion exchanged with an iron element at a cation site of zeolite, is used. In addition, this zeolite, which is ion exchanged with an iron element, may include an iron oxide as the iron component. In this way, because zeolite including the iron element has high adsorption-desorption rate of $NH_3$, and also high activity as SCR, it is preferable to be included as a main component. Here the main component means that it is 50% by weight or more in total zeolite amount to be used in the catalyst composition to be covered on a substrate of the SCR catalyst.

β-Type zeolite has a 3D pore structure as described above, and provides easy diffusion of cation in ion exchange and diffusion of a gas molecule such as $NH_3$. In addition, because such a structure is unique structure and a complicated pore structure, as compared with mordenite, faujasite or the like having only linear pore aligned in one direction, β-type zeolite is an effective material for an automotive catalyst, due to little arising structural collapse caused by heat, and having high stability.

(β-Type Zeolite Added with Iron Element)

Generally, in zeolite, as a solid acid site, a cation is present as a counter ion. As the cation, an ammonium ion or a proton is general, however, the β-type zeolite added with an iron element as the cation species is preferable (hereafter, it may be referred to as "Fe-β" in some cases).

It is preferable that ratio for β-type zeolite to be ion exchanged with the iron element is expressed by the following expression (9), based on the fact that one iron element (ion) and two [$AlO_{4/2}$] units, which is a monovalent ion exchange site in zeolite, form an ion pair.

[Mole number of the iron element included by ion exchange in unit weight of zeolite/{(mole number of $Al_2O_3$ present in unit weight of zeolite)×(1/2)}]×100 (9)

Ion exchange ratio is preferably 10 to 100%, more preferably 12 to 92%, and still more preferably 30 to 70%. The ion exchange ratio of 92% or lower further stabilizes a skeleton structure of zeolite, enhances heat resistance of a catalyst and hence lifetime of the catalyst, and is capable of providing more stabilized catalytic activity. However, the too low ion exchange ratio below 10% may not provide sufficient denitration performance in some cases. It should be noted that in the case where the above-described ion exchange ratio is 100%, it means that all of the cation species in zeolite is ion exchanged with the iron element. In this way, ion exchanged zeolite exerts superior purification capability.

(Various Kinds of Inorganic Materials)

In the present invention, the inorganic material may be selected as appropriate from a transition metal oxide such as titania, zirconia, or tungsten oxide; a rare earth oxide such as ceria, lanthanum oxide, praseodymium oxide, samarium oxide, gadolinium oxide, or neodymium oxide; a base metal oxide such as gallium oxide or tin oxide; or a composite oxide thereof, or the like. In addition to the above, because alumina or silica, and alumina or silica modified with a rare earth, an alkali metal, an alkaline earth group or the like, are superior in heat resistance and has larger specific surface area as compared with the above oxide, by mixing or making composite with the above oxide, specific surface area of the above oxide itself can be increased, and thus is more preferable.

Among them, ceria has been known as an $NO_x$ adsorption function material, and also in the present invention, by promoting adsorption of $NO_x$, it has function enabling to promote the SCR reaction between $NH_3$ and $NO_x$. In addition, zirconia can be expected to have effect as a dispersion maintaining material for highly dispersing other components in a thermally stable state. Additionally, a tungsten oxide has strong acidity and has strong adsorption force of urea or ammonia, which is an alkaline component, therefore, use of the tungsten oxide can be expected to have effect of enhancing denitration performance, therefore it is preferable to use these oxides alone or by mixing or composite making.

These oxides and composite oxides thereof are not especially limited, as for a composition, a structure and a preparation thereof. For example, there may be adopted a method for calcining a solid material obtained by dissolving a starting raw material having a form of a nitrate, a sulfate, a carbonate, an acetate, a chloride or the like, including the above element, into an aqueous solution, then mixing and precipitating as a precipitate, by pH adjustment or the like, or by evaporation to dryness; a method for performing the above treatment by solubilizing these multiple metal salts all at once, in mixing and making composite; or a method for performing the above treatment for single or multiple metal salts to form an oxide, and then supporting residual metal salts all at once or sequentially.

5. [Reducing Agent Spraying Means]

In the exhaust gas purification catalyst apparatus of the present invention, the reducing agent spraying means (Injector) is the one for supplying the reducing agent selected from the urea component or the ammonia component, and usually composed of a storage tank of the reducing agent, a piping and a spraying nozzle attached at the tip thereof.

Position of the reducing agent spraying means is set at a position backward of catalyzed soot filter (CSF), and forward of the selective reduction catalyst (SCR) for contacting nitrogen oxides ($NO_x$) with the reducing agent to reduce. Further, in the case where the second oxidation catalyst (DOC) is set between CSF and SCR, it is preferable that it is set at the backward of the second oxidation catalyst (DOC).

Kind of the reducing component is selected from the urea component or the ammonia component. As the urea component, an aqueous solution of urea, having a specified concentration of 31.8 to 33.3% by weight, for example, a trade name of "Adblue", and as the ammonia component, ammonia gas may be used other than ammonia water. However, because $NH_3$, which is the reducing agent, itself has harmfulness such as irritating odor, it is a preferable system that $NH_3$ is generated by thermal decomposition or hydrolysis by adding an aqueous solution of urea from the upstream of the denitration catalyst, and which is acted as the reducing agent, as compared with use of the $NH_3$ component as it is, as the reducing agent.

6. [AMOX: Ammonia Oxidation Catalyst]

In the exhaust gas purification apparatus of the present invention, the ammonia oxidation catalyst (AMOX) can be arranged, further after SCR, as needed. In a practical way, in the case where $NO_x$ or $NH_3$ cannot be purified completely down to regulated value or lower by SCR, AMOX is used additionally.

Accordingly, AMOX includes also a catalyst component having $NO_x$ purification function, other than a catalyst having $NH_3$ oxidation function. As a catalyst having $NH_3$ oxidation function, it is preferable to support one or more elements selected from platinum, palladium, or rhodium and the like, as noble metal component, on one or more kinds of inorganic materials consisting of alumina, silica, titania, zirconia and the like. In addition, it is also preferable to use an inorganic material having heat resistance enhanced by adding a promoter such as a rare earth, an alkali metal, or an alkaline earth group. Platinum and palladium as the noble metals exert superior oxidation activity. By supporting this on the inorganic material having large specific surface area and also high heat resistance, sintering of the noble metal component becomes difficult, and by maintaining specific surface area of the noble metal high, active site increases and high activity can be exerted.

On the other hand, as the catalyst having $NO_x$ purification function, all of the zeolite and oxides described at the SCR section can be used.

These two kinds of catalysts are mixed uniformly and may be coated onto an integrated-type honeycomb structure, however, the catalyst having $NH_3$ oxidation function may also be coated onto the lower layer, and the catalyst having $NO_x$ purification function may also be coated onto the upper layer.

II. [Exhaust Gas Purification Apparatus (DOC+CSF+DOC+SCR)]

In the present invention, another DOC is arranged at the latter part of CSF, relative to the above exhaust gas purification apparatus (DOC+CSF+SCR), and carbon monoxide (CO), hydrocarbons (HC) and nitric oxide (NO) in exhaust gas discharged from a diesel engine, are oxidized at the first DOC, and particulate matter (PM) in exhaust gas is captured at the next CSF, and removed by combustion (oxidation), and further oxidation function of unburned CO, HC and NO is enhanced at the next DOC, and after supplying the reducing agent selected from a urea component or an ammonia component into this apparatus, nitrogen oxides ($NO_x$) are removed by reduction by contacting with the reducing agent at SCF. Hereafter, this exhaust gas purification catalyst apparatus (DOC+CSF+DOC+SCR) is also referred to as a catalyst apparatus II.

Figure 2:
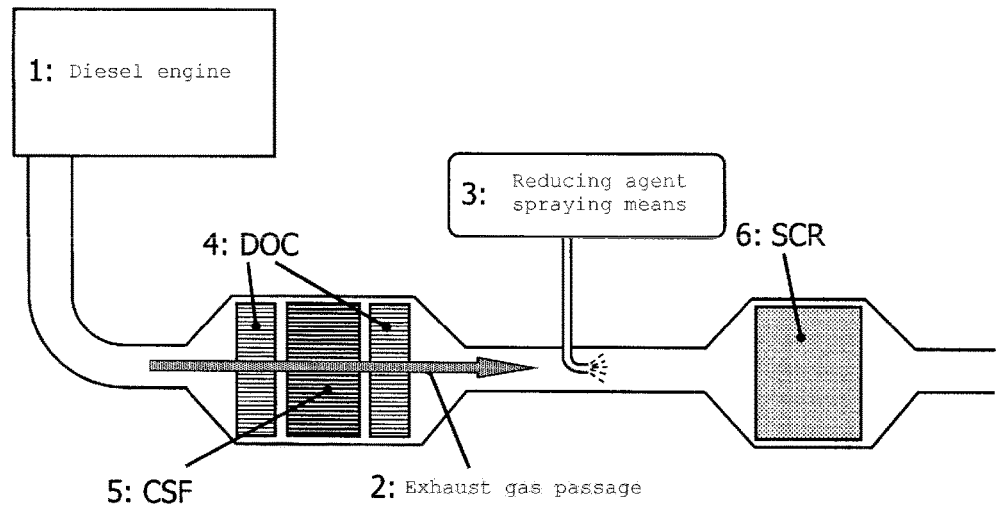
FIG. 2 is an explanation drawing showing schematically a configuration, where an oxidation catalyst (DOC), a catalyzed soot filter (CSF), a oxidation catalyst (DOC), a supplying means of a reducing component, and a selective reduction catalyst (SCR) are arranged in this order, in an exhaust gas purification catalyst apparatus of the present invention.

That is, the catalyst apparatus II of the present invention is, as shown in FIG. 2, an exhaust gas purification catalyst apparatus, where the oxidation catalysts (DOC) 4 is sandwiched at the both sides of the catalyzed soot filter (CSF) 5, as well as the reducing agent spraying means 3 is installed at the backward thereof, and the selective reduction catalyst (SCR) 6 is arranged at the backward of this injection means 3, in an exhaust gas passage 2 from a diesel engine 1.

In this way, in the catalyst apparatus II, by setting DOC in front of or at the backward of CSF, and placing a part of the noble metals of the front stage DOC to the latter part DOC, oxidation performance of NO can be enhanced, while decreasing total use amount of the noble metals, although volume as a catalyst system increases, and an $NO_x$ reduction reaction, using the urea aqueous solution or the ammonia aqueous solution ($NH_3$ component) in SCR arranged backward thereof is promoted.

EXAMPLES

Characteristics of the present invention will be made more clearly below, by showing Examples and Comparative Examples, however, the present invention should not be limited to the aspects of these Examples.

It should be noted that pore size of alumina to be used in the oxidation catalyst (DOC) and the catalyzed soot filter (CSF), to be used in the present Example as well as Comparative Example, was measured by a method shown below.

<Pore Distribution Measurement>

Pore distribution of alumina was measured by a mercury intrusion method, using PASCAL140-440, manufactured by Thermo Co., Ltd., after drying 0.3 g of various kinds of alumina powder (mode diameter was adopted as pore size).

In addition, evaluation tests by durability specifications and an engine, where the oxidation catalyst (DOC) and the catalyzed soot filter (CSF) were used alone or in combination, were performed by methods shown below.

<Durability Test of Catalyst>

The oxidation catalyst (DOC) and the catalyzed soot filter (CSF) obtained by the following Examples and Comparative Examples were heat treated under air atmosphere inside an electric furnace, under condition of 750° C. for 50 hours, and 750° C. for 100 hours, as for the catalyst for a model gas evaluation test and as for the catalyst for engine evaluation test, respectively.

<Model Gas Evaluation Test of Catalyst>

The oxidation catalyst (DOC) obtained by the following Examples 1 and 2, and Comparative Example 1 was cut out to a size (a diameter of 24 mm×a length of 66 mm, 30 mL) of catalyst for model gas evaluation, using a core drill and a diamond cutter, and after heat treatment thereof at 750° C. for 50 hours using an electric furnace, it was subjected to a temperature rising and temperature lowering light off test, using a model gas evaluation apparatus.

1. Temperature Rising Light Off Test

After mounting the catalyst for the model gas evaluation onto a holder of the model gas evaluation apparatus, while flowing gas components shown in Table 1 in GHSV (Gas Hourly Space Velocity: space velocity at gas; inflow velocity of reaction gasper unit volume of the catalyst) of 40,000/hr, temperature thereof was raised from room temperature up to 400° C. in a rate of 30° C./minute. In this case, temperature at the catalyst bed of catalyst was measured, when oxidation rate of NO, CO or HC reached to each numerical value. It should be noted that NOT30 represents catalyst bed temperature of catalyst, when 30% of NO was oxidized, COT75 represents catalyst bed temperature of catalyst, when 75% of CO was oxidized, and HCT75 represents catalyst bed temperature of catalyst, when 75% of HC was oxidized.

TABLE 1

| Flow rate | | 20 L/min |
|---|---|---|
| GHSV | | 40,000/hr |
| Components | $C_3H_6$ | 300 ppmC |
| | CO | 300 ppm |
| | NO | 300 ppm |
| | $O_2$ | 6.0% |
| | $CO_2$ | 6.0% |
| | $H_2O$ | 6.0% |
| | $N_2$ | Remainder |

<Engine Evaluation Test of a Catalyst>

After performing heat treatment at 750° C. for 100 hours, using an electric furnace, the oxidation catalyst (DOC) and the catalyzed soot filter (CSF) of the following Examples 3 to 7, and Comparative Examples 1 to 4 were stored into a converter, each alone or in combination thereof, and then the converter was mounted at the discharge port of a 5 L diesel engine to perform two kinds of evaluation tests, that is, a steady state test and a temperature rising and temperature lowering light off test, by the following procedure.

1. Steady State Test 1-1. Oxidation Performance of NO

Number of revolutions of the diesel engine was set at 1,800 rpm, and catalyst bed temperature was fixed at 250° C. and 300° C., and then a part of exhaust gas was suctioned from the catalyst entrance and catalyst exit by a suction tube to measure NO concentration using an NO meter to calculate NO oxidation ratio from difference thereof, by the following expression:

NO oxidation ratio(%)=100×{(NO concentration at the entrance)−(NO concentration at the exit)}/(NO concentration at the entrance)

1-2. Combustibility of Light Oil

Number of revolutions of the diesel engine was set at 1,800 rpm, and catalyst bed temperature was fixed at 250° C. and 300° C., and then light oil was ON/OFF sprayed in 20 ml/min (250° C.) or 30 ml/min (300° C.) in an interval of 5 minutes, from a spray tube installed in front of the catalyst entrance, to measure temperature of exhaust gas using a thermocouple installed at the backward of the catalyst exit, and the result was adopted as temperature increment (the following ΔT (° C.)) of exhaust gas in light oil spray ON/OFF. The higher ΔT exhibits the more heat generation by combustion of light oil, thus showing superior combustibility.

$$\Delta T(°\text{C.})=(\text{exhaust gas temperature at the catalyst}\\ \text{exit when light oil spray is ON})-(\text{exhaust gas}\\ \text{temperature at the catalyst exit when light oil}\\ \text{spray is OFF})$$

2. Temperature Rising and Temperature Lowering Light Off Test

Number of revolutions of the diesel engine was set at 1,800 rpm, and catalyst bed temperature was fixed at 150° C., and then temperature was raised up to 400° C. in a rate of 10° C./min, and then temperature was lowered down to 150° C. in a rate of 10° C./min. In this temperature rising, catalyst bed temperature at the first stage oxidation catalyst (DOC) was measured, when oxidation rate of NO, CO or HC reached to each numerical value.

It should be noted that NOT30 represents catalyst bed temperature at the first stage oxidation catalyst (DOC), when 30% of NO was oxidized, COT75 represents catalyst bed temperature at the first stage oxidation catalyst (DOC), when 75% of CO was oxidized, and HCT75 represents catalyst bed temperature at the first stage oxidation catalyst (DOC), when 75% of HC was oxidized.

Example 1

Production of Oxidation Catalyst (DOC) (1)>

=Lower Layer=

1 kg of γ-alumina powder A having a BET specific surface area of 150 m$^2$/g and a pore size of 9 nm, and water were put into a ball mill and milled till predetermined particle size is attained to obtain slurry α.

Subsequently, an integral structure-type substrate, that is, a honeycomb flow-through-type cordierite substrate {300 cell/inch$^2$ (465 k/m$^2$)/8 mil (0.2 mm), a diameter of 7.5 inch (190.5 mm)×a length of 3.3 inch (83.8 mm), 2.39 L}, was immersed into this slurry, and coated by a wash-coat method, so as to attain an alumina supported amount of 65 g/L per unit volume. After that it was dried at 150° C. for 1 hour and calcined at 500° C. for 2 hours under atmospheric environment to obtain a product already coated with the lower layer of DOC (1).

=Upper Layer=

An aqueous solution of platinum nitrate and an aqueous solution of palladium nitrate were mixed, as raw materials of the noble metal component, to obtain a Pt—Pd mixed solution. Here, ratio of platinum and palladium was set at 5:1, in weight ratio.

Next, onto 1 kg of γ-alumina powder B having a BET specific surface area of 150 m$^2$/g and a pore size of 23 nm, the Pt—Pd mixed solution was impregnated, so as to attain 1.292% by weight (Pt/Pd=5/1) in noble metal equivalent, to obtain Pt—Pd supported alumina powder a. 1114.4 g of this Pt—Pd supported alumina powder a, 8 g of barium hydroxide, in barium oxide equivalent, 45 g of refined sugar and water were put into a ball mill and milled till predetermined particle size is attained to obtain slurry β.

Subsequently, the product already coated with the lower layer was immersed into this slurry, and coated by a wash-coat method, so as to attain a catalyst supported amount of 112.24 g/L per unit volume. After that it was dried at 150° C. for 1 hour and calcined at 500° C. for 2 hours under atmospheric environment to obtain DOC (1) (Pt=1.2 g/L, Pd=0.24 g/L, BaO=0.8 g/L, amount of catalyst=112.24 g/L, amount of lower layer alumina: 65 g/L).

<Production of Catalyzed Soot Filter CSF (1)>

An aqueous solution of platinum nitrate and an aqueous solution of palladium nitrate were mixed, as raw materials of the noble metal component, to obtain a Pt—Pd mixed solution. Here, ratio of platinum and palladium was set at 2:1, in weight ratio.

Next, onto 600 g of γ-alumina powder B, 400 g of γ-alumina powder C having a BET specific surface area of 165 m$^2$/g and a pore size of 14 nm, the Pt—Pd mixed solution was impregnated and supported, so as to attain 2.43% by weight in noble metal equivalent, to obtain Pt—Pd supported alumina powder b.

Then, 543.2 g of Pt—Pd supported alumina powder b, 30 g of silica gel in silica equivalent and water were put into a ball mill and milled till predetermined particle size is attained to obtain slurry γ. Subsequently, an integral structure-type substrate, that is, a honeycomb wall-flow-type cordierite substrate {300 cell/inch$^2$ (465 k/m$^2$)/12 mil (0.3 mm), a diameter of 7.5 inch (190.5 mm)×a length of 6.7 inch (170.2 mm), 4.85 L}, was immersed into this slurry, and coated by a wash-coat method, so as to attain a catalyst supported amount of 28.66 g/L per unit volume. After that it was dried at 150° C. for 1 hour and calcined at 500° C. for 2 hours under atmospheric environment to obtain CSF (1) (Pt=0.44 g/L, Pd=0.22 g/L, amount of catalyst=28.66 g/L).

<Apparatus Configuration>

Figure 3:
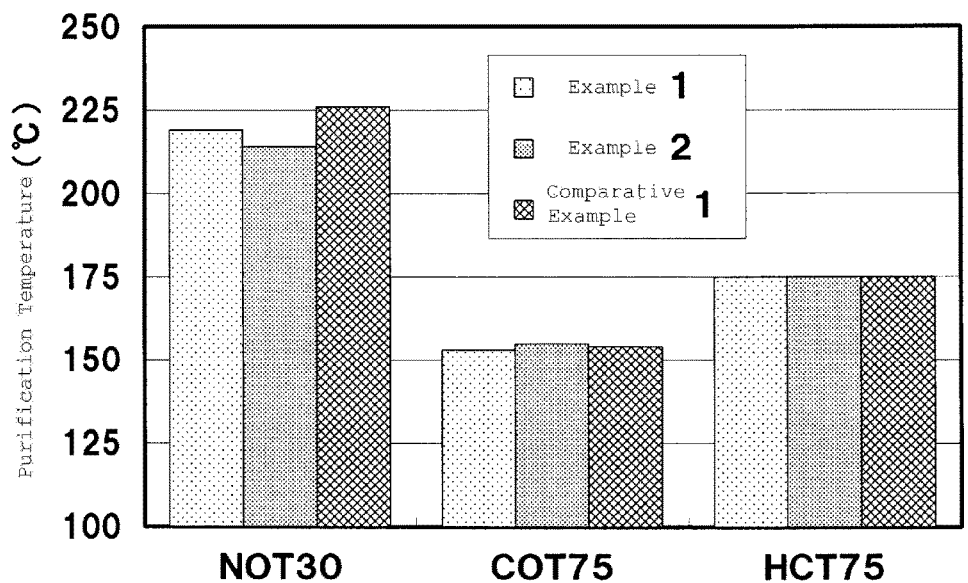
FIG. 3 is a graph showing oxidation performances of NO, CO and HC in a model gas evaluation test using an oxidation catalyst (DOC).

A catalyst for model gas evaluation was cut out from the above oxidation catalyst DOC (1), to a size of (a diameter of 24 mm×a length of 66 mm, 30 mL), using a core drill and a diamond cutter, and after heat treatment thereof at 750° C. for 50 hours, the model gas evaluation test was performed using the above oxidation catalyst DOC (1). Results of oxidation activities of NO, CO and HC are shown in FIG. 3. It should be noted that components of the oxidation catalyst DOC (1) and amount of the noble metals are shown in Tables 2 and 3.

After that, by arranging the oxidation catalyst DOC (1) {a diameter of 7.5 inch (190.5 mm)×a length of 3.3 inch (83.8 mm), 2.39 L}, after heat treatment at 750° C. for 100 hours, at the front stage inside a catalyst converter, placing the CSF (1), after heat treatment under the same condition, at the rear stage thereof, arranging a selective reduction catalyst (SCR, refer to JP-A-2009-26098) which was heat treated at 650° C. for 100 hours, in air stream containing 10% steam, at a different catalyst converter at the rear side thereof, and connecting these in series, an apparatus of the present invention shown in FIG. 1 was configured. Good performance of exhaust gas purification was confirmed by using this apparatus.

Example 2

Production of Oxidation Catalyst (DOC) (2)

=Lower Layer=

A product already coated with the lower layer of DOC (2) was obtained similarly by a preparation method of the lower layer of Example 1.

=Upper Layer=

Onto 1 kg of γ-alumina powder B, the Pt—Pd mixed solution was impregnated, so as to attain 0.777% by weight (Pt/Pd=5/1) in noble metal equivalent, to obtain Pt—Pd supported alumina powder c. In addition, onto 200 g of γ-alumina powder C, the Pt—Pd mixed solution was impregnated, so as to attain 3.85% by weight (Pt/Pd=5/1) in noble metal equivalent, to obtain Pt—Pd supported alumina powder d.

And, 927.2 g of the Pt—Pd supported alumina powder c, 187.2 g of the Pt—Pd supported alumina powder d, 8 g of barium hydroxide, in barium oxide equivalent, 45 g of refined sugar and water were put into a ball mill and milled till predetermined particle size is attained to obtain slurry δ.

Subsequently, the product already coated with the lower layer was immersed into this slurry, and coated by a wash-coat method, so as to attain a catalyst supported amount of 112.24 g/L per unit volume. After that it was dried at 150° C. for 1 hour and calcined at 500° C. for 2 hours under atmospheric environment to obtain DOC (2) (Pt=1.2 g/L, Pd=0.24 g/L, BaO=0.8 g/L, amount of catalyst=112.24 g/L, amount of lower layer alumina: 65 g/L).

<Apparatus Configuration>

A catalyst for model gas evaluation was cut out from the above oxidation catalyst DOC (2), to a size of (a diameter of 24 mm×a length of 66 mm, 30 mL), using a core drill and a diamond cutter, and after heat treatment thereof at 750° C. for 50 hours, the model gas evaluation test was performed using the above oxidation catalyst DOC (2). Results of oxidation activities of NO, CO and HC are shown in FIG. 3. It should be noted that components of the oxidation catalyst DOC (2) and amount of the noble metals are shown in Tables 2 and 3.

After that, by arranging the oxidation catalyst DOC (2) {a diameter of 7.5 inch (190.5 mm)×a length of 3.3 inch (83.8 mm), 2.39 L}, after heat treatment at 750° C. for 100 hours, at the front stage inside a catalyst converter, and connecting the heat treated products of CSF and SCR in series using the catalyst converter, an apparatus of the present invention shown in FIG. 1 was configured. Good performance of exhaust gas purification was confirmed by using this apparatus.

Comparative Example 1

Production of Oxidation Catalyst (DOC) (3)

=Lower Layer=

Onto 341 g of γ-alumina powder A, 506 g of γ-alumina powder D having a BET specific surface area of 220 m²/g and a pore size of 8 nm, and 253 g of γ-alumina powder E having a BET specific surface area of 160 m²/g and a pore size of 10 nm, the Pt—Pd mixed solution was impregnated, so as to attain 0.614% by weight (Pt/Pd=5/1) in noble metal equivalent, to obtain Pt—Pd supported alumina powder e. 1106.8 g of this Pt—Pd supported alumina powder e, 111 g of refined sugar and water were put into a ball mill and milled till predetermined particle size is attained to obtain slurry ε.

Subsequently, a honeycomb flow-through-type cordierite substrate, similar to the one as in Example 1, was immersed into this slurry, and coated by a wash-coat method, so as to attain a catalyst supported amount of 110.68 g/L per unit volume. After that it was dried at 150° C. for 1 hour and calcined at 500° C. for 2 hours under atmospheric environment to obtain a product already coated with the lower layer of DOC (3).

=Upper Layer=

Onto 279 g of γ-alumina powder A, 414 g of γ-alumina powder D, and 207 g of γ-alumina powder E, the Pt—Pd mixed solution was impregnated, so as to attain 1.25% by weight (Pt/Pd=5/1) in noble metal equivalent, to obtain Pt—Pd supported alumina powder f.

Next, 911.4 g of the Pt—Pd supported alumina powder f, 91 g of refined sugar and water were put into a ball mill and milled till predetermined particle size is attained to obtain slurry ζ.

Subsequently, the product already coated with the lower layer was immersed into this slurry, and coated by a wash-coat method, so as to attain a catalyst supported amount of 91.14 g/L per unit volume. After that it was dried at 150° C. for 1 hour and calcined at 500° C. for 2 hours under atmospheric environment to obtain DOC (3) (Pt=1.52 g/L, Pd=0.30 g/L, total amount of catalyst=201.82 g/L).

<Apparatus Configuration>

A catalyst for model gas evaluation was cut out from the above oxidation catalyst DOC (3), to a size of (a diameter of 24 mm×a length of 66 mm, 30 mL), using a core drill and a diamond cutter, and after heat treatment thereof at 750° C. for 50 hours, the model gas evaluation test was performed using the above oxidation catalyst DOC (3). Results of oxidation activities of NO, CO and HC are shown in FIG. 3. It should be noted that components of the oxidation catalyst DOC (3) and amount of the noble metals are shown in Tables 2 and 3.

After that, by arranging the oxidation catalyst DOC (3) {a diameter of 7.5 inch (190.5 mm)×a length of 3.3 inch (83.8 mm), 2.39 L}, after heat treatment at 750° C. for 100 hours, at the front stage inside a catalyst converter, and connecting the heat treated products of CSF and SCR in series using the catalyst converter, an apparatus of the present invention shown in FIG. 1 was configured. Good performance of exhaust gas purification was not obtained even by using this apparatus.

TABLE 2

| | Example 1 | Example 2 | Comparative Example 1 |
|---|---|---|---|
| DOC(1) | Alumina B BaO — | DOC(2) | Alumina B Alumina C BaO | DOC(3) | Alumina A Alumina D Alumina E |

TABLE 3

| | Noble metal | Example 1 | Example 2 | Comparative Example 1 |
|---|---|---|---|---|
| DOC | Pt (g) | 2.87 | 2.87 | 3.63 |
| | Pd (g) | 0.57 | 0.57 | 0.72 |
| Ratio | Pt (%) | 100 | 100 | 126 |
| | Pd (%) | 100 | 100 | 126 |

Footnote:
Pt amount and Pd amount were calculated based on the catalyst of Example 1 as 100%.

[Evaluation 1]

From FIG. 3 summarizing the model gas evaluation test by the catalysts after heat treatment at 750° C. for 50 hours, and Tables 2 and 3 showing catalyst components and amount of the noble metals, it is understood the followings on oxidation activities of NO, CO and HC, in the case of single oxidation catalyst (DOC).

Firstly, as is clear from the results of oxidation activity test of NO of FIG. 3, the oxidation catalyst DOC (1) (Pt/Pd=5/1) (weight ratio, the same shall apply hereafter) of Example 1 of the present invention, because of using alumina B having a pore size of 23 nm, as a base material to support the noble metals, although total amount of platinum and palladium is as high as 26% by weight, exerted superior oxidation activity of NOX to the oxidation catalyst DOC (3) of Comparative Example 1 (refer to Table 3), where three kinds of alumina A, D and E, having a pore size of 10 nm or smaller, as a base material to support the noble metals, were used. Further, the oxidation catalyst DOC (2) of Example 2, where alumina C having a pore size of 14 nm was added to alumina B having a pore size of 23 nm, as abase material to support the noble metals, exerted far higher oxidation activity of NO as compared with the oxidation catalyst DOC (1) of Example 1, where only alumina B having a pore size of 23 nm was used in the upper layer containing noble metals.

However, there was observed no difference in oxidation activity of CO or HC, between the oxidation catalysts DOC (1) and DOC (2) of Examples 1 and 2, and the oxidation catalyst DOC (3) of Comparative Example 1.

These results show that use of alumina having a pore size of 12 nm or larger, as the base material of the noble metal of Pt or Pd, is effective to enhance oxidation activity of NO, and in addition, multiple use of alumina having a pore size of 12 nm or larger is effective to further enhance oxidation activity of NO.

Example 3

Production of Oxidation Catalyst (DOC) (4)

=Lower Layer=

Onto 1 kg of γ-alumina powder B, the Pt—Pd mixed solution was impregnated, so as to attain 0.293% by weight (Pt/Pd=5/1) in noble metal equivalent, and then an aqueous solution of barium hydroxide was impregnated, so as to attain 0.065% by weight in barium oxide equivalent to obtain Pt—Pd—Ba supported alumina powder g.

Similarly, onto 200 g of γ-alumina powder C, the Pt—Pd mixed solution was impregnated and supported, so as to attain 1.45% by weight (Pt/Pd=5/1) in noble metal equivalent, and then an aqueous solution of barium hydroxide was impregnated, so as to attain 0.323% by weight in barium oxide equivalent to obtain Pt—Pd—Ba supported alumina powder h.

And, 920.3 g of Pt—Pd—Ba supported alumina powder g, 186.3 g of Pt—Pd—Ba supported alumina powder h, 5.8 g of barium hydroxide in barium oxide equivalent, 111 g of refined sugar, and water were put into a ball mill and milled till predetermined particle size is attained to obtain slurry η.

Subsequently, a honeycomb flow-through-type cordierite substrate, the similar one as in Example 1, was immersed into this slurry, and coated by a wash-coat method, so as to attain an catalyst supported amount of 111.24 g/L per unit volume. After that it was dried at 150° C. for 1 hour and calcined at 500° C. for 2 hours under atmospheric environment to obtain a product already coated with the lower layer of DOC (4).

=Upper Layer=

Onto 1 kg of γ-alumina powder B, the Pt—Pd mixed solution was impregnated and supported, so as to attain 0.595% by weight (Pt/Pd=5/1) in noble metal equivalent, and barium hydroxide, so as to attain 0.172% by weight in barium oxide equivalent to obtain Pt—Pd—Ba supported alumina powder i. In addition, onto 200 g of γ-alumina powder C, the Pt—Pd mixed solution was impregnated and supported, so as to attain 2.89% by weight (Pt/Pd=5/1) in noble metal equivalent, and barium hydroxide, so as to attain 0.834% by weight in barium oxide equivalent to obtain Pt—Pd—Ba supported alumina powder j.

Then 755.8 g of Pt—Pd—Ba supported alumina powder i, 155.8 g of Pt—Pd—Ba supported alumina powder j, 10.4 g of barium hydroxide, in barium oxide equivalent, 92 g of refined sugar and water were put into a ball mill and milled till predetermined particle size is attained to obtain slurry 0.

Subsequently, the product already coated with the lower layer was immersed into this slurry, and coated by a wash-coat method, so as to attain a catalyst supported amount of 92.2 g/L per unit volume. After that it was dried at 150° C. for 1 hour and calcined at 500° C. for 2 hours under atmospheric environment to obtain DOC (4) (Pt=1.2 g/L, Pd=0.24 g/L, BaO=2.0 g/L, total amount of catalyst=203.44 g/L).

<Apparatus Configuration>

Figure 4:
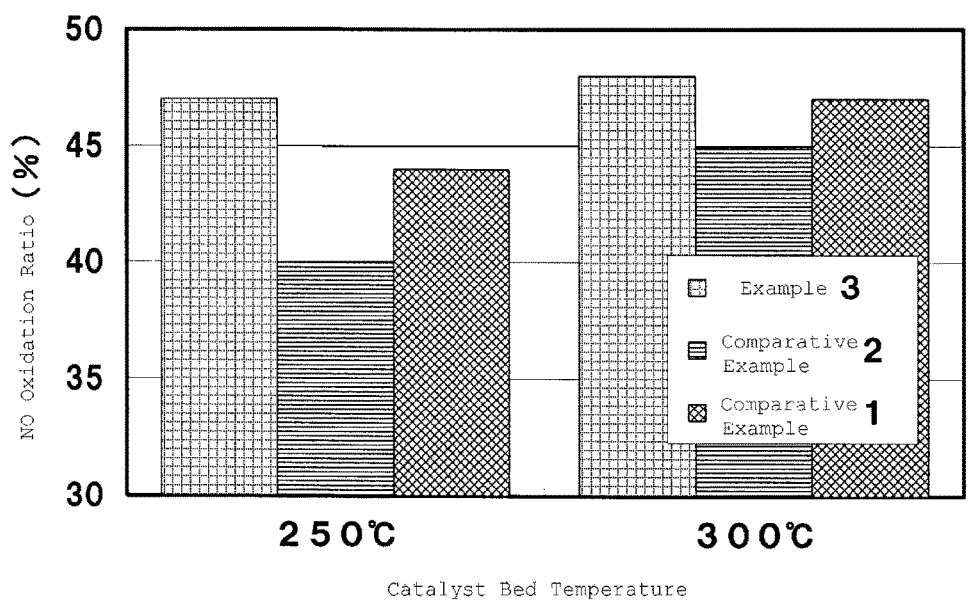
FIG. 4 is a graph showing oxidation activity of NO in an exhaust gas purification test by a diesel engine on a mount using an oxidation catalyst (DOC).
Figure 5:
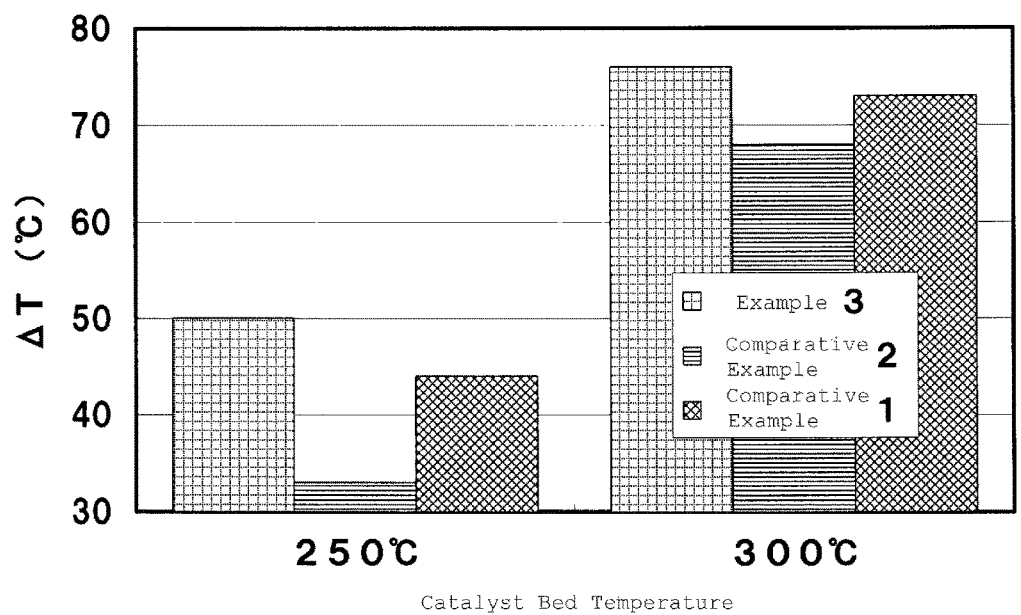
FIG. 5 is a graph showing combustibility of light oil in an exhaust gas purification test by a diesel engine bench using an oxidation catalyst (DOC).

An engine evaluation test above oxidation catalyst DOC (4) after heat treatment at 750° C. for 100 hours was performed using the above oxidation catalyst DOC (4). Results of oxidation activity of NO are shown in FIG. 4 and results of light oil combustion performance are shown in FIG. 5. It should be noted that components of the oxidation catalyst DOC (4) and amount of the noble metals are shown in Tables 4 and 5.

After that, by arranging the above oxidation catalyst DOC (4) at the front stage inside a catalyst converter, and connecting the heat treated products of CSF and SCR in series using the catalyst converter, at the backward thereof, similarly as in Example 1, an apparatus of the present invention shown in FIG. 1 was configured. Good performance of exhaust gas purification was confirmed by using this apparatus.

Comparative Example 2

Production of Oxidation Catalyst (DOC) (5)

DOC (5) (Pt=1.20 g/L, Pd=0.24 g/L, total amount of catalyst=201.44 g/L) was obtained by the same catalyst preparation method as in DOC (3), except in that Pt—Pd supported amount of all Pt—Pd supported alumina powder was decreased by 21% by weight uniformly, in the oxidation catalyst DOC (3) of Comparative Example 1.

<Apparatus Configuration>

The engine evaluation test using the oxidation catalyst DOC (5) after heat treatment at 750° C. for 100 hours was performed using the oxidation catalyst DOC (5). Results of oxidation activity of NO are shown in FIG. 4 and results of light oil combustion performance are shown in FIG. 5. It should be noted that components of the oxidation catalyst DOC (5) and amount of the noble metals are shown in Tables 4 and 5.

After that, by arranging the oxidation catalyst DOC (5) at the front stage inside a catalyst converter, and connecting the heat treated products of CSF and SCR in series using the catalyst converter, at the backward thereof, similarly as in Example 1, an apparatus for Comparative Example shown in FIG. 1 was configured. Good performance of exhaust gas purification was not obtained even by using this apparatus.

TABLE 4

| Example 3 | | Comparative Example 2 | | Comparative Example 1 | |
|---|---|---|---|---|---|
| DOC(4) | Alumina B | DOC(5) | Alumina A | DOC(3) | Alumina A |
|  | Alumina C |  | Alumina D |  | Alumina D |
|  | BaO |  | Alumina E |  | Alumina E |

TABLE 5

|     |           | Example 3 | Comparative Example 2 | Comparative Example 1 |
|-----|-----------|-----------|-----------------------|-----------------------|
| DOC | Pt (g)    | 2.87      | 2.87                  | 3.63                  |
|     | Pd (g)    | 0.57      | 0.57                  | 0.72                  |
|     | BaO (g)   | 4.78      | 0.00                  | 0.00                  |
|     | Alumina (g) | 478     | 478                   | 478                   |
| Ratio | Pt (%)  | 100       | 100                   | 126                   |
|     | Pd (%)    | 100       | 100                   | 126                   |

(Footnote)
Pt amount and Pd amount were calculated based on the catalyst of Example 3 as 100%.

[Evaluation 2]

From FIGS. 4 and 5 summarizing an engine steady state evaluation test by the catalysts after heat treatment at 750° C. for 100 hours, and Tables 4 and 5 showing catalyst components and amount of the noble metals, it is understood the following on oxidation activity of NO and light oil combustibility, in the case of single oxidation catalyst (DOC).

Firstly, as is clear from the results of oxidation activity test of NO of FIG. 4, the oxidation catalyst DOC (4) (Pt/Pd=5/1) of Example 3 of the present invention exerted superior oxidation activity of NO, in particular, at low temperature (250° C.), to the oxidation catalyst DOC (5) of Comparative Example 2 (refer to Table 5), where amount of platinum and palladium was the same. Further, the oxidation catalyst DOC (4) of Example 3 exerted higher oxidation activity of NO as compared with the oxidation catalyst DOC (3) of Comparative Example 1, where amount of platinum and palladium was increased each by a little less than 30% by weight (refer to Table 5), and effect thereof was significant at low temperature (250° C.).

In addition, as is clear from the results of light oil combustibility test of FIG. 5, the oxidation catalyst DOC (4) of Example 3 of the present invention showed higher temperature increase by heat generation accompanied with light oil combustion, as compared with the oxidation catalyst DOC (5) of Comparative Example 2, where amount of platinum and palladium was the same, and effect thereof was significant at low temperature (250° C.). Still more, the oxidation catalyst DOC (4) of Example 3 showed also higher temperature increase of heat generation by light oil combustion, as compared with the oxidation catalyst DOC (3) of Comparative Example 1, where amount of platinum and palladium was increased each by a little less than 30% by weight. These results show that the oxidation catalyst DOC (4) of Example 3, which contains barium oxide (BaO), and where pore size of two kinds of alumina is 12 nm to 40 nm {in practice, 23 nm (alumina B) and 14 nm (alumina C) (refer to Table 4)}, is superior in oxidation activity of NO as well as light oil combustibility, to the oxidation catalyst DOC (3) and DOC (5) of Comparative Examples 1 and 2, which do not contain barium oxide, and where pore size of alumina is also 10 nm or smaller {in practice, 9 nm (alumina A), 8 nm (alumina D) and 10 nm (alumina E), (refer to Table 4)}.

Example 4

Apparatus Configuration

Figure 6:
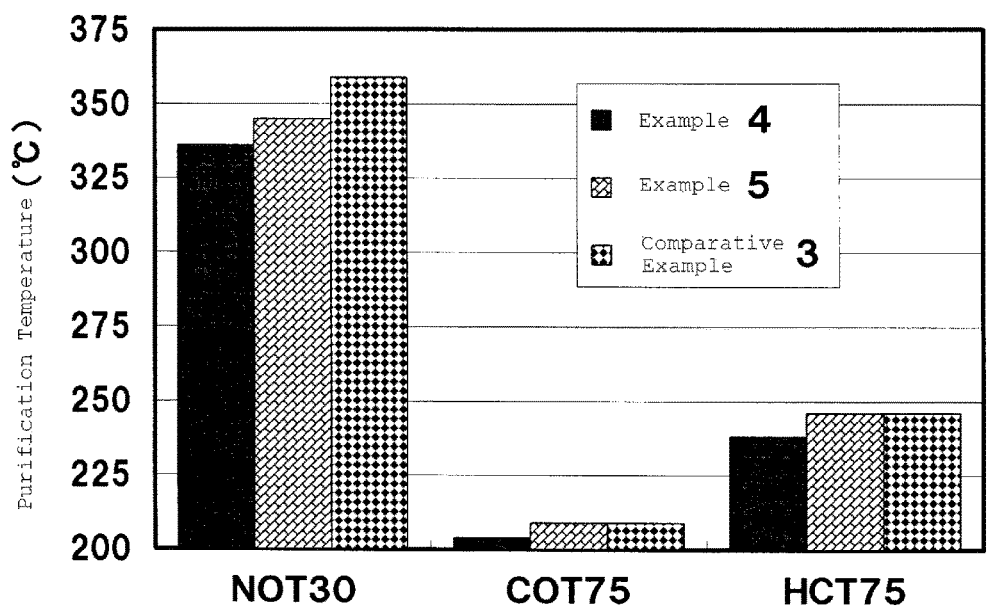
FIG. 6 is a graph showing oxidation activities of NO, CO and HC in an exhaust gas purification test by a diesel engine bench using an oxidation catalyst (DOC) and a catalyzed soot filter (CSF).

An engine evaluation test was performed, after heat treatment of each of DOC (4) of the Example 3 and CSF (1) of the Example 1 at 750° C. for 100 hours, by connecting them in series inside the catalyst converter. Results of oxidation activities of NO, CO and HC are shown in FIG. 6. It should be noted that components of DOC (4)+CSF (1) and amount of the noble metals are shown in Tables 6 and 7.

By connecting the heat treated product of SCR in series using the catalyst converter, at the latter part of the catalyst converter of the {DOC (4)+CSF (1)}, similarly as in Example 1, an apparatus of the present invention shown in FIG. 1 was configured. Good performance of exhaust gas purification was confirmed using this apparatus.

Example 5

Production of Catalyzed Soot Filter CSF (2)

Onto 1 kg of γ-alumina powder F having a BET specific surface area of 95 m$^2$/g and a pore size of 10 nm, the Pt—Pd mixed solution (Pt/Pd=2/1) was impregnated and supported, so as to attain 2.43% by weight in noble metal equivalent, to obtain Pt—Pd supported alumina powder k.

And, 543.2 g of the Pt—Pd supported alumina powder k, 30 g of alumina sol in alumina equivalent and water were put into a ball mill and milled till predetermined particle size is attained to obtain slurry τ. Subsequently, a honeycomb wall-flow-type cordierite substrate, similar to the one as in Example 1, was immersed into this slurry, and coated by a wash-coat method, so as to attain a catalyst supported amount of 28.66 g/L per unit volume. After that it was dried at 150° C. for 1 hour and calcined at 500° C. for 2 hours under atmospheric environment to obtain CSF (2) (Pt=0.44 g/L, Pd=0.22 g/L, amount of catalyst=28.66 g/L).

<Apparatus Configuration>

An engine evaluation test was performed, after heat treatment of each of DOC (4) of the Example 3 and the CSF (2) at 750° C. for 100 hours, by connecting them in series inside the catalyst converter. Results of oxidation activities of NO, CO and HC are shown in FIG. 6. It should be noted that components of DOC (4)+CSF (2) and amount of the noble metals are shown in Tables 6 and 7.

By connecting the heat treated product of SCR in series using the catalyst converter, at the latter part of the catalyst converter of the above {DOC (4)+CSF (2)}, similarly as in Example 1, an apparatus of the present invention shown in FIG. 1 was configured. Relatively good performance of exhaust gas purification was confirmed using this apparatus.

Comparative Example 3

Production of Catalyzed Soot Filter CSF (3)

CSF (3) (Pt=0.58 g/L, Pd=0.29 g/L, amount of catalyst=28.87 g/L) was obtained by the same catalyst preparation method as in the catalyzed soot filter CSF (2) of Example 5, except in that Pt—Pd supported amount of Pt—Pd supported alumina powder, was increased by 32% by weight uniformly.

<Apparatus Configuration>

An engine evaluation test was performed, after heat treatment of each of DOC (3) of the Comparative Example 1 and the CSF (3) at 750° C. for 100 hours, by connecting them in series inside the catalyst converter. Results of oxidation activities of NO, CO and HC are shown in FIG. 6. It should be noted that components of DOC (3)+CSF (3) and amount of the noble metals are shown in Tables 6 and 7.

By connecting the heat treated product of SCR in series using the catalyst converter, at the latter part of the catalyst converter of the above {DOC (3)+CSF (3)}, similarly as in Example 1, an apparatus for comparison shown in FIG. 1 was configured. Relatively good performance of exhaust gas purification was not obtained even by using this apparatus.

TABLE 6

|  | Example 4 | Example 5 | Comparative Example 3 |
|---|---|---|---|
| DOC(4) | Alumina B DOC(4) | Alumina B DOC(3) | Alumina A |
|  | Alumina C | Alumina C | Alumina D |
|  | BaO | BaO | Alumina E |
| CSF(1) | Alumina B CSF(2) | Alumina F CSF(3) | Alumina F |
|  | Alumina C | — | — |

TABLE 7

|  | Noble metal | Example 4 | Example 5 | Comparative Example 3 |
|---|---|---|---|---|
| DOC | Pt (g) | 2.87 | 2.87 | 3.63 |
|  | Pd (g) | 0.57 | 0.57 | 0.72 |
| CSF | Pt (g) | 2.13 | 2.13 | 2.81 |
|  | Pd (g) | 1.07 | 1.07 | 1.41 |
| Total | Pt (g) | 5.00 | 5.00 | 6.44 |
|  | Pd (g) | 1.64 | 1.64 | 2.13 |
| Ratio | Pt (%) | 100 | 100 | 129 |
|  | Pd (%) | 100 | 100 | 130 |

(Footnote)
Pt amount and Pd amount were calculated based on the catalyst of Example 4 as 100%.

[Evaluation 3]

From FIG. 6 summarizing a engine steady state evaluation test by the above catalysts after heat treatment at 750° C. for 100 hours, and Tables 6 and 7 showing catalyst configuration and components and amount of the noble metals, it is understood the following on oxidation activities of NO, CO and HC, in the case where the oxidation catalyst (DOC) and the catalyzed soot filter (CSF) are combined.

As is clear from the oxidation activity test of NO, CO and HC of FIG. 6, Example 4 of the present invention, which is the case where the catalyzed soot filter CSF (1) using two kinds of alumina having a pore size of 12 to 120 nm, is arranged at the latter part of the oxidation catalyst DOC (4), exerted superior oxidation activities of all of NO, CO and HC.

In addition, Example 5 of the present invention, which is the case where the catalyzed soot filter CSF (2) using alone alumina having a pore size of 10 nm, is arranged at the latter part of the oxidation catalyst DOC (4), exerted oxidation activities of all of NO, CO and HC.

On the other hand, the catalyst of Comparative Example 3 {a combination of DOC (3) and CSF (3)}, exerted low oxidation activities of all of NO, CO and HC, although supported amount of the noble metals was increased by about 30% by weight as compared with Examples 4 and 5, in both of the oxidation catalyst and the catalyzed soot filter.

The above results suggest that contribution of combination of DOC+CSF on oxidation activities of NO, CO and HC is larger in the front stage DOC than in the latter part CSF, because there is not so much difference in total amount of the noble metals (total amount of Pt+Pd) of DOC and CSF used in Examples 4 and 5, and reduction of the noble metals is considered effective to CSF than to DOC.

Example 6

Production of Oxidation Catalyst DOC (6)

=Lower Layer=

Onto 1,000 g of γ-alumina powder B, the Pt—Pd mixed solution (Pt/Pd=2/1) was impregnated, so as to attain 0.336% by weight (Pt/Pd=2/1) in noble metal equivalent, and then an aqueous solution of barium hydroxide was impregnated, so as to attain 0.054% by weight in barium oxide equivalent to obtain Pt—Pd—Ba supported alumina powder 1.

Similarly, onto 200 g of γ-alumina powder C, the same Pt—Pd mixed solution was impregnated and supported, so as to attain 1.66% by weight (Pt/Pd=2/1) in noble metal equivalent, and then an aqueous solution of barium hydroxide was impregnated, so as to attain 0.268% by weight in barium oxide equivalent to obtain Pt—Pd—Ba supported alumina powder m.

And, 920.6 g of Pt—Pd—Ba supported alumina powder 1, 186.6 g of Pt—Pd—Ba supported alumina powder m, 3 g of barium hydroxide in barium oxide equivalent, 111 g of refined sugar, and water were put into a ball mill and milled till predetermined particle size is attained to obtain slurry κ.

Subsequently, an integral structure-type substrate, that is, a honeycomb flow-through-type cordierite substrate {300 cell/inch$^2$ (465 k/m$^2$)/8 mil (0.2 mm), a diameter of 7.5 inch (190.5 mm)×a length of 2.64 inch (67.1 mm), 1.91 L}, was immersed into this slurry, and coated by a wash-coat method, so as to attain a catalyst supported amount of 111.02 g/L per unit volume. After that it was dried at 150° C. for 1 hour and calcined at 500° C. for 2 hours under atmospheric environment to obtain a catalyst already coated with the lower layer of DOC (6).

=Upper Layer=

Onto 1 kg of γ-alumina powder B, the Pt—Pd mixed solution was impregnated and supported, so as to attain 0.682% by weight (Pt/Pd=2/1) in noble metal equivalent, and barium hydroxide, so as to attain 0.099% by weight in barium oxide equivalent to obtain Pt—Pd—Ba supported alumina powder n. In addition, onto 200 g of γ-alumina powder C, the Pt—Pd mixed solution was impregnated and supported, so as to attain 3.31% by weight (Pt/Pd=2/1) in noble metal equivalent, and barium hydroxide, so as to attain 0.481% by weight in barium oxide equivalent to obtain Pt—Pd—Ba supported alumina powder o.

And, 755.9 g of Pt—Pd—Ba supported alumina powder n, 155.9 g of Pt—Pd—Ba supported alumina powder o, 4.5 g of barium hydroxide, in barium oxide equivalent, 92 g of refined sugar and water were put into a ball mill and milled till predetermined particle size is attained to obtain slurry λ.

Subsequently, the catalyst already coated with the lower layer was immersed into this slurry, and coated by a wash-coat method, so as to attain a catalyst supported amount of 91.63 g/L per unit volume. After that it was dried at 150° C. for 1 hour and calcined at 500° C. for 2 hours under atmospheric environment to obtain DOC (6) (Pt=1.1 g/L, Pd=0.55 g/L, BaO=1.0 g/L, total amount of catalyst=202.65 g/L).

<Production of Oxidation Catalyst DOC (7)>

DOC (7) (Pt=1.2 g/L, Pd=0.24 g/L, BaO=2.0 g/L, total amount of catalyst=203.44 g/L) was obtained by the same catalyst preparation method as in DOC (4) of Example 3, except in that size of the honeycomb flow-through-type cordierite substrate was changed to {300 cell/inch$^2$ (465 k/m²)/8 mil (0.2 mm), a diameter of 7.5 inch (190.5 mm)×a length of 2.64 inch (67.1 mm), 1.91 L}, in production of DOC (4) of Example 3.

<Production of Catalyzed Soot Filter CSF (4)>

Onto 600 g of γ-alumina powder B and 400 g of γ-alumina powder C, the Pt—Pd mixed solution (Pt/Pd=2/1) was impregnated and supported, so as to attain 2.39% by weight in noble metal equivalent, to obtain alumina powder p, which supports Pt—Pd. And, 130.3 g of the alumina powder p, which supports Pt—Pd, 7.2 g of silica sol in silica equivalent and water were put into a ball mill and milled till predetermined particle size is attained to obtain slurry μ. Subsequently, a honeycomb wall-flow-type cordierite substrate, similar to the one as in Example 1, was immersed into this slurry, and coated by a wash-coat method, so as to attain a catalyst supported amount of 6.876 g/L per unit volume. After that it was dried at 150° C. for 1 hour and calcined at 500° C. for 2 hours under atmospheric environment to obtain CSF (4) (Pt=0.104 g/L, Pd=0.052 g/L, amount of catalyst=6.876 g/L).

<Apparatus Configuration>

Figure 7:
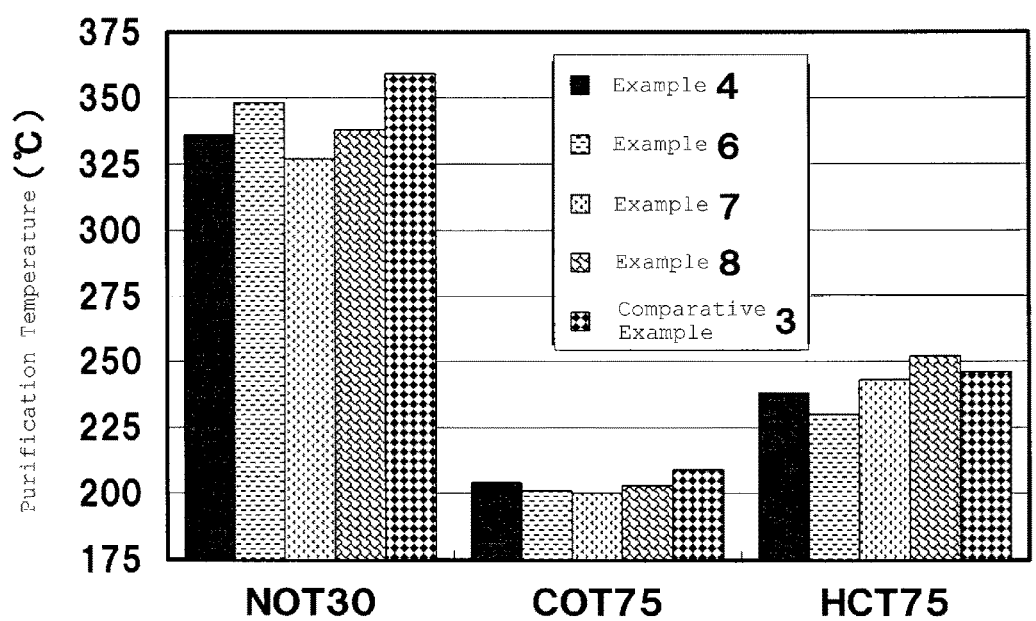
FIG. 7 is a graph showing oxidation activities of NO, CO and HC in an exhaust gas purification test by a diesel engine bench, where two oxidation catalysts (DOC) and a catalyzed soot filter (CSF) are aligned in series.

By connecting the above DOC (6), DOC (7) and CSF (4) in series inside the catalyst converter, in this order, an apparatus of the present invention was configured. An engine temperature rising evaluation test was performed using this, and results of oxidation activities of NO, CO and HC are shown in FIG. 7. It should be noted that components of DOC (6), DOC (7) and CSF (4), and amount of the noble metals are shown in Tables 8 and 9.

By arranging heat treated product of SCR, similarly as in Example 1, at the latter part of CSF (4) of the Example 6, an apparatus of the present invention shown in FIG. 1 was configured (it is different from apparatuses of Examples 1 to 5, in that DOC is installed divided into two). Good performance of exhaust gas purification was confirmed using this apparatus.

Example 7

Apparatus Configuration

By using the DOC (6), DOC (7) and CSF (4) of the above Example 6, and connecting in series inside the catalyst converter, in the order of DOC+CSF+DOC, an apparatus of the present invention was configured. An engine temperature rising evaluation test was performed using this, and results of oxidation activities of NO, CO and HC are shown in FIG. 7. It should be noted that components of DOC (6), CSF (4) and DOC (7), and amount of the noble metals are shown in Tables 8 and 9.

By arranging heat treated product of SCR, similarly as in Example 1, at the latter part of DOC (7) of the Example 7, an apparatus of the present invention shown in FIG. 2 was configured. Good performance of exhaust gas purification was confirmed using this apparatus.

Example 8

DOC (8) (Pt=0.91 g/L, Pd=0.18 g/L, BaO=2.0 g/L, total amount of catalyst=203.09 g/L) was obtained by the same catalyst preparation method as Example 3, except in that Pt—Pd supported amount of all Pt—Pd supported alumina powder, was decreased by 24% by weight uniformly, in the oxidation catalyst DOC (4) of Example 3.

<Apparatus Configuration>

By using the DOC (6) and CSF (4) of the Example 6 and the DOC (8), and connecting in series inside the catalyst converter, in the order of DOC+CSF+DOC, an apparatus of the present invention was configured. An engine temperature rising evaluation test was performed using this, and results of oxidation activities of NO, CO and HC are shown in FIG. 7. It should be noted that components of CSF (4) and amount of the noble metals are shown in Tables 8 and 9.

By arranging heat treated product of SCR, similarly as in Example 1, at the latter part of DOC (8) of the Example 8, an apparatus of the present invention shown in FIG. 2 was configured. Good performance of exhaust gas purification was confirmed using this apparatus.

TABLE 8

| | Example 4 | Example 6 | Example 7 | Example 8 | Comparative Example 3 |
|---|---|---|---|---|---|
| DOC(4) | Alumina B | DOC(6) Alumina B | DOC(6) Alumina B | DOC(6) Alumina B | DOC(3) Alumina A |
| | Alumina C | Alumina C | Alumina C | Alumina C | Alumina D |
| | BaO | BaO | BaO | BaO | Alumina E |
| CSF(1) | Alumina B | DOC(7) Alumina B | CSF(4) Alumina B | CSF(4) Alumina B | CSF(3) Alumina F |
| | Alumina C | Alumina C | Alumina C | Alumina C | — |
| | | BaO | BaO DOC(7) | Alumina B DOC(8) | Alumina B |
| | | CSF(4) Alumina B | Alumina B | Alumina C | Alumina C |
| | | Alumina C | Alumina C | BaO | BaO |

TABLE 9

| ordering | Noble metal | Example 4 | Example 6 | Example 7 | Example 8 | Comparative Example 3 |
|---|---|---|---|---|---|---|
| DOC | Pt (g) | 2.87 | 2.10 | 2.10 | 2.10 | 3.63 |
| | Pd (g) | 0.57 | 1.05 | 1.05 | 1.05 | 0.72 |
| DOC | Pt (g) | — | 2.29 | — | — | — |
| | Pd (g) | — | 0.46 | — | — | — |
| CSF | Pt (g) | 2.13 | 0.50 | 0.50 | 0.50 | 2.81 |
| | Pd (g) | 1.07 | 0.25 | 0.25 | 0.25 | 1.41 |
| DOC | Pt (g) | — | — | 2.29 | 1.74 | — |
| | Pd (g) | — | — | 0.46 | 0.35 | — |
| Total | Pt (g) | 5.00 | 4.89 | 4.89 | 4.34 | 6.44 |
| | Pd (g) | 1.64 | 1.76 | 1.76 | 1.65 | 2.13 |
| Ratio | Pt (%) | 100 | 98 | 98 | 87 | 129 |
| | Pd (%) | 100 | 107 | 107 | 101 | 130 |

(Footnote)
Pt amount and Pd amount were calculated based on the catalyst of Example 4 as 100%.

[Evaluation 4]

From FIG. 7 summarizing the engine temperature rising evaluation test by the catalysts (DOC+CSF, DOC+DOC+CSF, or DOC+CSF+DOC) after heat treatment at 750° C. for 100 hours, and Tables 8 and 9 showing catalyst configuration, components and noble metal amount, the following is understood.

Example 6, in which oxidation catalyst DOC (6)(Pt/Pd=2/1), where supported amount of the noble metals was concentrated to DOC based on knowledge obtained by evaluation 3, oxidation catalyst DOC (7)(Pt/Pd=2/1) of the present invention, and catalyzed soot filter CSF (4), where supported amount of the noble metals of CSF was decreased drastically, were arranged in series, exerted far superior oxidation activities of CO and HC to Example 4, but a little inferior oxidation activity of NO, although total supported amount of both Pt and Pd is nearly the same as in the Example 4 (refer to Table 9). However, even so, oxidation activity of NO was superior to that of Comparative Example 3 where total supported amount of the noble metals is over by a little less than 30% by weight. Reason for this is considered that an oxidation reaction of CO or HC occurs more preferentially than an oxidation reaction of NO, by concentrated support of the noble metals on DOC, and it is considered that it is suitable to oxidation of CO or HC, but it is a little not preferable combination to oxidation of NO.

Further, Example 7, in which DOC(6), CSF(4) and DOC (7) were arranged in series in this order, so as to sandwich catalyzed soot filter CSF (4) of the present invention, exerted NO oxidation activity far superior to Example 4, although total supported amount of both Pt and Pd is nearly the same as in the Example 4 (refer to Table 9). In addition, Example 7 also showed nearly the same oxidation activities of CO and HC as in Example 4, and also superior to Comparative Example 3, where total supported amount of the noble metals is over by a little less than 30% by weight.

In addition, Example 8, in which oxidation catalyst DOC (6) of the present invention, catalyzed combustion filter CSF (4), and oxidation catalyst DOC (8), where supported amount of the noble metals (Pt/Pd=5/1) was further decreased, were arranged in series, was superior to Comparative Example 3 in oxidation activities of NO and CO, although a little inferior in oxidation activity of HC, irrespective of decrease in total supported amount of both Pt and Pd still more about 10% by weight as compared with Example 7, and decrease as much as by nearly 30% by weight as compared with Comparative Example 3 (refer to Table 9).

In this way, the present invention contributes to enhance oxidation activities of NO, CO and HC by the addition of BaO, optimization of specifications of alumina fine pores, optimization of arrangement of DOC and the like, while decreasing supported amount of high price noble metals (Pt and Pd) by as much as about 20 to 30% by weight. In particular, the present invention exerts significant effect in enhancement of oxidation activity of NO.

INDUSTRIAL APPLICABILITY

The exhaust gas purification apparatus of the present invention can be used in purification technology of $NO_x$ generating by lean combustion, for example, in applications for a mobile body including a diesel automobile and also a gasoline automobile, a ship or the like, or for a fixed applications such as a power generator, and in particular, useful for a diesel automobile.

The invention claimed is:
1. An exhaust gas purification apparatus, comprising:
a first oxidation catalyst (DOC) comprising a noble metal component for oxidizing, in particular, nitrogen monoxide, among carbon monoxide, hydrocarbons, nitrogen oxides, and for combusting light oil,
a catalyzed soot filter (CSF) comprising a noble metal component for collecting a particulate component such as soot and removing by combustion (oxidation),
a second oxidation catalyst (DOC),
a reducing agent spraying means for supplying a reducing agent selected from a urea component or an ammonia component, and
a selective reduction catalyst (SCR) for removing by reduction of nitrogen oxides by contacting with the reducing agent,
wherein the first oxidation catalyst (DOC), the catalyzed soot filter (CSF), the second oxidation catalyst (DOC), the reducing agent spraying means, and the selective reduction catalyst (SCR) are arranged in this order from the upstream side of an exhaust gas passage, in order to purify carbon monoxide, hydrocarbons, nitrogen oxides, and particulate components such as soot, in exhaust gas discharged from a diesel engine,
the first oxidation catalyst (DOC) and the second oxidation catalyst (DOC) have a catalyst layer where platinum (Pt) and palladium (Pd) are supported on alumina ($Al_2O_3$) having a pore size of 12 to 120 nm, and ratio of platinum and palladium is 1:1 to 11:2 in weight equivalent, and
the catalyzed combustion filter (CSF) has a catalyst layer, where platinum (Pt) and palladium (Pd) are supported on alumina having a pore size of 12 to 120 nm, or a mixture of two or more kinds of alumina having different pore size within its range, and ratio of platinum and palladium is 1:1 to 11:4 in weight equivalent.

2. The exhaust gas purification apparatus according to claim 1, wherein the catalyst layer is coated onto an integral structure-type substrate, in one or more layers.

3. The exhaust gas purification apparatus according to claim 1, wherein the catalyst layer has a base layer composed of alumina, at the lower layer thereof.

4. The exhaust gas purification apparatus according to claim 1, wherein the alumina having the pore size of 12 to 120 nm is a mixture of two or more kinds of alumina having different pore size.

5. The exhaust gas purification apparatus according to claim 1, wherein barium oxide is included in the first oxidation catalyst (DOC) is in an amount of 0.5 to 4.0 g/L.

6. The exhaust gas purification apparatus according to claim 1, wherein the first oxidation catalyst (DOC) or the second oxidation catalyst (DOC) includes a coated amount of the catalyst layer of 50 to 300 g/L.

7. The exhaust gas purification apparatus according to claim 1, wherein the first oxidation catalyst (DOC) or the second oxidation catalyst (DOC) includes a total supported amount of the noble metals of 0.5 to 4.0 g/L in metal equivalent per volume.

8. The exhaust gas purification apparatus according to claim 1, wherein the catalyzed soot filter (CSF) includes a coated amount of the catalyst layer of 4 to 100 g/L.

9. The exhaust gas purification apparatus according to claim 1, wherein the catalyzed soot filter (CSF) includes a total supported amount of the noble metals of 0.05 to 2.0 g/L in metal equivalent per volume.

10. The exhaust gas purification apparatus according to claim 1, further comprising an ammonia oxidation catalyst (AMOX) arranged after the selective reduction catalyst (SCR).

* * * * *